(12) United States Patent
Kyo

(10) Patent No.: US 9,129,085 B2
(45) Date of Patent: Sep. 8, 2015

(54) MEMORY CONTROLLER AND SIMD PROCESSOR

(75) Inventor: Shorin Kyo, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 173 days.

(21) Appl. No.: 13/541,476

(22) Filed: Jul. 3, 2012

(65) Prior Publication Data

US 2013/0024658 A1 Jan. 24, 2013

(30) Foreign Application Priority Data

Jul. 21, 2011 (JP) ................................. 2011-159752

(51) Int. Cl.
*G06F 12/00* (2006.01)
*G06F 15/80* (2006.01)

(52) U.S. Cl.
CPC .................................. *G06F 15/8015* (2013.01)

(58) Field of Classification Search
CPC ......... G06F 15/16; G06F 12/02; G06F 15/80; G06F 15/801; G06F 15/8007; G06F 15/8053; G06F 15/7815
See application file for complete search history.

(56) References Cited

U.S. PATENT DOCUMENTS

| | | | | |
|---|---|---|---|---|
| 5,587,742 | A * | 12/1996 | Hau et al. | 348/441 |
| 2008/0091904 | A1 * | 4/2008 | Nakajima | 711/167 |
| 2009/0043986 | A1 * | 2/2009 | Kyo | 712/29 |
| 2010/0146241 | A1 * | 6/2010 | Rakib et al. | 712/22 |

FOREIGN PATENT DOCUMENTS

| | | | | |
|---|---|---|---|---|
| EP | 2254057 | A1 * | 11/2010 | ............... G06F 9/38 |
| JP | 11-066033 | | 3/1999 | |

OTHER PUBLICATIONS

S. Kyo, S. Okazaki IMAPCAR: A 100 GOPS In-Vehicle Vision Processor Based on 128 Ring Connected Four-Way VLIW Processing Elements, Springer Science, Nov. 6, 2008.*
S. Kyo, S. Okazaki An Integrated Memory Array Processor Architecture for Embedded Image Recognition Systems, IEEE 2005.*
IMAPCAR Series Processor User's Manual—NEC 2009, pp. 1, 33, 35, 50, 52, 59-62.*

(Continued)

*Primary Examiner* — Cheng-Yuan Tseng
*Assistant Examiner* — Francisco Grullon
(74) *Attorney, Agent, or Firm* — McDermott Will & Emery LLP

(57) ABSTRACT

Technology to suppress the drop in SIMD processor efficiency that occurs when exchanging two-dimensional data in a plurality of rectangular regions, between an external section and a plurality of processor elements in an SIMD processor, so that one rectangular region corresponds to one processor element. In the SIMD processor, an address storage unit in a memory controller is capable of setting N number of addresses Ai (i=1 through N) in an external memory by utilizing a control processor. A parameter storage unit is capable of setting a first parameter OSV, a second parameter W, and a third parameter L by utilizing a control processor. A data transfer unit executes the transfer of data between an external memory, and the buffers in N number of processor elements contained in the applicable SIMD processor, based on the contents of the address storage unit and the parameter storage unit.

8 Claims, 13 Drawing Sheets

(56) References Cited

OTHER PUBLICATIONS

IMAPCAR SIMD Programming Techniques—NEC 2009.*
Shorin Kyo et al., "A Video Recognition Processor for Intelligent Cruise Control Based on 128 4-Way VLIW RISC Processing Elements," IEICE Technical Reports, Technical Committee on Integrated Circuits and Devices (ICD), May 2003, vol. 103, No. 89, 12-24.

* cited by examiner

FIG. 12 (BACKGROUND)

MEMORY CONTROLLER AND SIMD PROCESSOR

CROSS-REFERENCE TO RELATED APPLICATIONS

The disclosure of Japanese Patent Application No. 2011-159752 filed on Jul. 21, 2011 including the specification, drawings and abstract is incorporated herein by reference in its entirely.

BACKGROUND

The present invention relates to memory access control and more specifically relates to memory access control technology for SIMD (Single Instrument Multiple Data) processors.

The SIMD processor is capable of simultaneously executing the same processing for a plurality of data from one instruction. FIG. 12 shows a typical structure of the SIMD processor.

The SIMD processor 10 shown in FIG. 12 is comprised of a control processor 20 and a processor array 30. The processor array 30 is a one-dimensional linked dispersed memory type processor array containing a plurality of (6 elements in the example shown in the drawing) processor elements. These processor elements perform the same processing according to instructions from the control processor 20. When the control processor 20 sends instructions to the PE array 30, the mask bit or mask flag (hereafter unified to "mask flag") specifies those processor elements not required in the processing. This is, in other words, a state where the plural processor elements contained in the PE array 30 are either performing the same processing or not performing any processing.

In the following description, the control processor is called "CP" and the processor array and processor element are respectively called "PE array" and "PE."

Each of the PE (PE1 to PE6) contained in the PE array 30 possess identical structures and so PE1 is utilized to describe a typical PE structure. In the drawing, the PE1 is comprised of a buffer 42, a local memory 44, MEMCTL 46, and an arithmetic logic unit 48.

The arithmetic logic unit 48 exchanges data with adjacent PE and also performs arithmetical processing. The MEMCTL 46 controls the local memory access and the external memory access.

The local memory access is the memory access generated within the PE array 30 and more specifically is write requests and read requests from the arithmetic logic unit 48. The MEMCTL 46 includes functions to write data from the arithmetic logic unit 48 into the local memory 44 according to write requests from the arithmetic logic unit 48 and to read requests from the arithmetic logic unit 48, and to read out data from the local memory 44 according to read request from the arithmetic logic unit 48 and provide the read data to the arithmetic logic unit 48.

To handle a memory access from the external section (including CP20) in the PE array 30, the MEMCTL 46 includes functions to write the data for the write request onto the local memory 44 in the case of a write access, and to read out the data for the read request from the local memory 44 in the case of a read access, and output that data.

A buffer 42 exchanges data between the PE1 and external sections and temporarily stores the exchanged data. More specifically, in the case for example where the CP20 is write-accessing the local memory 44, the CP20 first stores the data for writing into the buffer 42, and then sends a write command. When the PE1 receives the write command, the MEM-CTL46 writes the data stored in the buffer 42 into the local memory 44. Also, during read accessing for the local memory 44, the CP20 sends a read command including information on the data for reading. When the PE1 receives a read command, the MEMCTL46 read out the applicable data from the local memory 44 and outputs that read-out data to the buffer 42. The CP20 then reads out the data from the buffer 42 and outputs that read-out data to an external section.

The SIMD processor 10 is in this way especially effective in processing data groups (hereafter, called "two-dimensional data") where a plurality of data pieces are arrayed two-dimensionally. Two-dimensional data is for example an image comprised of pixel data in one screen or an aggregate of data input in respective boxes in a two-dimensional table. Here, the operation of the SIMD processor 10 is described for the case of filter processing taking the average of the pixel of interest and pixel to the right of the pixel of interest for an image in which there are six pixels per one row. Unless described to the contrary, "pixel" and "pixel value" possess the same meaning in the following text.

In this case, the column of images, and the PE in the PE array 30 possess a one-to-one relationship. Examining the pixel row of interest shows that the six pixels contained in the applicable row are each stored by way of the buffer 42 into the six local memories 44 in the PE array 30. The local memory 44 in each PE stores pixels from the same row into the same address.

The local memory 44 stores each pixel of the A row in the image into the address B of local memory in each PE. During filter processing of the A row, the controller 20 in this case issues an instruction "Find the average value of A row pixels with adjacent pixels on the right. Here, along with each PE reading out the address B pixels from its own local memory, the PE also requests the pixels in address B for the adjacent PE on the right. Along with averaging the data then sent from the adjacent PE on the right in response to that request, the PE also outputs to the adjacent PE on the left, the address B pixels read out from its own local memory in response to the request from the adjacent PE on the left.

Filter processing of all pixels in the row of interest is in this way simultaneously performed with good efficiency. In the following specifications, the "row" direction of the image does not signify a lateral direction when the applicable image is played, but signifies the direction assigned to array the PE. For example, when each pixel in one row was respectively assigned to each PE during playing of an image, then the "row" for playing (or reproducing) the image matches the "row" as used in these specifications. However, when each of the pixels in one column was respectively assigned to each PE, then the "column" when image was played becomes the "row" in these specifications. Two-dimensional data other than for image is also handled in the same way.

The number of pixels in one row in the image is not limited to the same number of PEs, and normally is a larger quantity than the PE. In cases with a larger number of pixels, the image is subdivided into blocks and processing performed on each block. The number of pixels along the row direction in each of these blocks may be the same quantity as the PE.

Methods have been disclosed from a variety of perspectives for the processing up to storing data from external sections in the local memory of each PE (Japanese Unexamined Patent Publication No. Hei 11 (1999)-66033 (patent document 1) and Shorin Kyo "Video Recognition Processor LSI for Intelligent Cruise Control Based on 128 4-Way VLIW RISC Processing Element" IEICE Technical Reports, Technical Committee on Integrated Circuits and Devices (ICD), May 2003, Vol. 103, No. 89, pp. 12-24 (non-patent document 1)). The non-patent document 1 for example discloses a method for contriving a process to improve SIMD processor efficiency.

The method as described in non-patent document 1 is described here. The SIMD processor 10 shown in FIG. 12 is utilized as an example of the SIMD processor. To make the description easy to understand, the case where storing six pixels of the A row described above, from the external memory to the local memory of each PE in the PE array 30; or in other words to each local memory 44 of the respective PE1 through PE6 is used as an example.

In this method, besides each function block shown in FIG. 12, the SIMD processor 10 is also comprised of a DMA controller (DMA: Direct Memory Access). Moreover, the buffers 42 in the PE1 through PE6 also configure the same shift register, and each of the buffers 42 are one stage of the applicable shift register.

The CP20 first of all sets the address in the external memory for the first pixel among the six pixels of the A row to serve as the readout address.

The DMA controller reads out the data set in the readout address (first pixel among the six pixels in the A row) from the external memory and stores the data in the buffer 42 of the PE1. The DMA controller next increases the readout address by one, and reads out the data in the increased read-out address or in other words, reads out the second pixel from the external memory and stores that data in buffer 42 of the PE1. The prior stored data (first pixel) in the buffer 42 of PE1 is then shifted for output from buffer 42 of PE1 to the buffer 42 of PE2, and stored in the buffer 42 of PE2. Repeating this type of shifting and storing, results in the sixth through second pixels being respectively stored in the buffers 42 of PE2 through PE6, when the sixth pixel is stored in the buffer 42 of PE1.

At this point in time, the DMA controller generates an interrupt so that the CP20 can issue a write command to each PE. Each of the PE writes the data stored in its own buffer into the local memory 44 by way of the MEMCTL46.

This technique stores data from the external memory that must be stored in the local memory 44 of each PE, into the local memory 44 of the respective PE by way of the buffer 42. The DMA controller handles the task of storing the data in each buffer so that each PE can perform arithmetical processing while the DMA controller is storing data into the buffer.

The process of writing data from the external memory into the local memory of the PE can therefore suppress effects on arithmetical processing in the PE. The process when reading out data from the PE local memory into the external memory is the same.

SUMMARY

Consider the case where performing the same processing on two-dimensional data in a plurality of regions. In FIG. 13, a search is for example made for a specified target object (for example, a face) in an image P, and sometimes the same processing is implemented on plural searched regions (rectangular regions BK1 to BK6 in the figure). Each of the rectangular regions of course includes a plurality of pixels.

In FIG. 13, the small frames within each rectangular region containing oblique lines indicate the first pixel (usually, the pixel on the upper left end) within the applicable rectangular region, and the frame colored in black indicates the second pixel within the applicable rectangular region.

In this case, efficient operation can be achieved by making one rectangular region correspond to one PE, and writing the data in these plural rectangular regions into each of the local memories in the plurality of PEs within the SIMD processor so that the same process can be executed on each PE.

The method in non-patent document 1 can be applied here in a process assumed to write data for the rectangular regions BK1 through BK6 from the external memory storing the pixel P, into the local memory 44 of each PE in the SIMD processor. The process flow in this case is assumed to proceed as follows.

The CP20 first of all sets the beginning address of the first pixel of rectangular region BK1 into the DMA controller as the read-out address.

The DMA controller reads out the data (first pixel in the rectangular region BK1) for the readout address that was set, from the external memory and stores it in the buffer 42 of the PE1. This pixel must ultimately be written into the local memory 44 of the PE6.

In the flow in the method in non-patent document 1, the pixel that the DMA controller must read out next is the pixel to write into the local memory 44 of PE5, or in other words is the first pixel of rectangular region BK2. However, when the DMA controller increases the readout address by one and reads out that address, then the next data for readout is the second pixel of rectangular region BK1.

Due to this state, the DMA controller cannot continually readout the next pixel needing readout. The CP20 therefore again sets the readout address (Here, the address of the first pixel of the rectangular region BK2) into the DMA controller, and the DMA controller reads out the data in the readout address that was set from the external memory and stores it in the buffer 42 of PE1. This pixel is ultimately a pixel that must be written into the local 44 of PE5. At the same time, the shift (register) operation stores the data (first pixel of rectangular region BK1) previously stored into the buffer 42 of PE1, into the buffer 42 of PE2.

Due to this operation flow, the readout of one pixel and the storage into the buffer 42 always requires that the CP20 set a readout address. The DMA controller cannot exhibit effective performance and efficiency of the SIMD processor 10 is not enhanced.

Moreover, the buffer 42 in each PE is not a structure capable of configuring one shift register, and this state holds true even in cases where each buffer 42 can be written onto separately.

If the method in non-patent document 1 cannot be applied then the efficiency of the SIMD processor 10 drops even further. An example of this case is described next. The buffers 42 in each PE can be written onto separately.

The CP20 first of all reads out the first pixel in rectangular region BK1 from the external memory and stores the data in the buffer 42 of PE6. The CP20 then issues a write command with mask flag that prevents operation of PE1 to PE5.

The MEMCTL46 in PE6 in this way performs the write operation, and writes the first pixel of rectangular range BK1 from the buffer 42, into the local memory 44.

The CP20 and the MEMCTL46 in PE6 repeatedly increase the number of pixels by the same process to ultimately write all of the pixels of the rectangular range BK1 into the local memory 44 of PE6.

The CP20 and the MEMCTL46 in PE5 then repeat the same process by a number of times matching the number of pixels in rectangular region BK2, to ultimately write all the pixels of the rectangular region BK2 into the local memory 44 of PE5.

The data in the rectangular regions BK3 to BK6 is also written into the local memory 44 in PE4 to PE1 by way of the same process.

As can be understood from the above description, the storing of data into the buffer 42 by the CP20, and the write operation by the PE for each rectangular region, are repeated a number of times matching the number of the pixels within the applicable rectangular region. During this time, the CP20 cannot broadcast instructions to the PE array 30, causing the problem that arithmetic processing in the PE array 30 stops.

Moreover, writing of data into the local memory 44 is performed one time for each rectangular region so that the local memory 44 of the applicable PE is frequently accessed. The local 44 of the applicable PE is fully occupied by the data transfer so that as expected, arithmetical processing in the PE array 30 stops even assuming that instructions were broadcast to the PE array 30 by a separate method.

In view of the above described problems with the related art, the present invention has the object of providing memory access control technology to suppress a drop in SIMD processor efficiency when exchanging two-dimensional data among the plural rectangular regions, between external sections and a plurality of processor elements of an SIMD processor, so that one rectangular region is made to correspond to one processor element.

According to one aspect of the present invention, a DMA controller is mounted in the SIMD processor. The applicable SIMD processor is configured from N number (N is an integer of 2 or more) of processor elements, each processor element has a capacity in S-size units, and includes a buffer to temporarily store data transferred between the applicable processor element and the external memory.

The memory controller is comprised of an address storage unit, a parameter storage unit, and a data transfer unit.

The address storage unit is capable of setting N number of addresses Ai (i=1 to N) in the external memory.

The parameter storage unit is capable of setting a first parameter OSV, a second parameter W, and a third parameter L.

The data transfer unit transfers data between the external memory and buffers containing N number of processor elements. The data transfer unit repeatedly performs a first process a certain number of times matching the third parameter L stored in the parameter storage unit according to the data transfer instructions.

The first process is a process to execute the fourth process along with the second process after repeating a third process along with the second process for M number of times as shown in formula (1).

$$M=W/S-1 \quad (1)$$

Here, W denotes the second parameter stored in the parameter storage unit, and S denotes the unit size.

The second process is a process to read out each S-sized unit portion of data from each address stored in the address storage unit so that one address corresponds to one processor element, and to store the data in the buffer of the corresponding processor element, during data transfer from the external memory to the buffers in N number of processor elements.

The second process is also a process to read out data stored in the buffers in each of the processor elements so that one address corresponds to one processor element, and to write the data into the corresponding address among the N number of address stored in the address storage unit, during transfer of data from buffers in N number of processor elements to the external memory.

The third process is a process for increasing each address Ai stored in the address storage unit according to the formula (2):

$$Ai=Ai+S \quad (2)$$

where Ai denotes i-th address, and S denotes the unit size.

The fourth process is a process for increasing each address Ai stored in the address storage unit in accordance with formula (3):

$$Ai=Ai+OSV \quad (3)$$

where Ai denotes i number of addresses, and OSV denotes the first parameter stored in the parameter storage unit.

Another aspect of the present invention is the SIMD processor. The applicable SIMD processor is comprised of a control processor, N number (N is an integer of 2 or more) of processor elements controlled by the control processors, and the above described memory controller. Each processor element has a capacity in S-sized units, and includes a buffer to temporarily store data transferred between the applicable processor element and the external memory.

During the transfer of data from the external memory to the buffers in each of the N number of processor elements by the memory controller, the control processor issues a write command to each of the processor elements each time all of the buffers in the N number of processor elements are full.

During the transfer of data from buffers in each of the N number of processor elements to the external memory by the DMA controller, the control processor issues a read command to each processor element, each time all of the buffers in the N number of processor elements are empty.

Methods, devices and systems into which the memory controller and/or control processor of the above aspect are substituted and displayed, or programs that execute these methods on a computer are also valid as aspects of the present invention.

The memory access control technology of the present invention is capable for example of suppressing a drop in SIMD processor efficiency when exchanging two-dimensional data among the plural rectangular regions, between external section and a plurality of processor elements of an SIMD processor, so that one rectangular region is made to correspond to one processor element.

DETAILED DESCRIPTION

Figure 1:
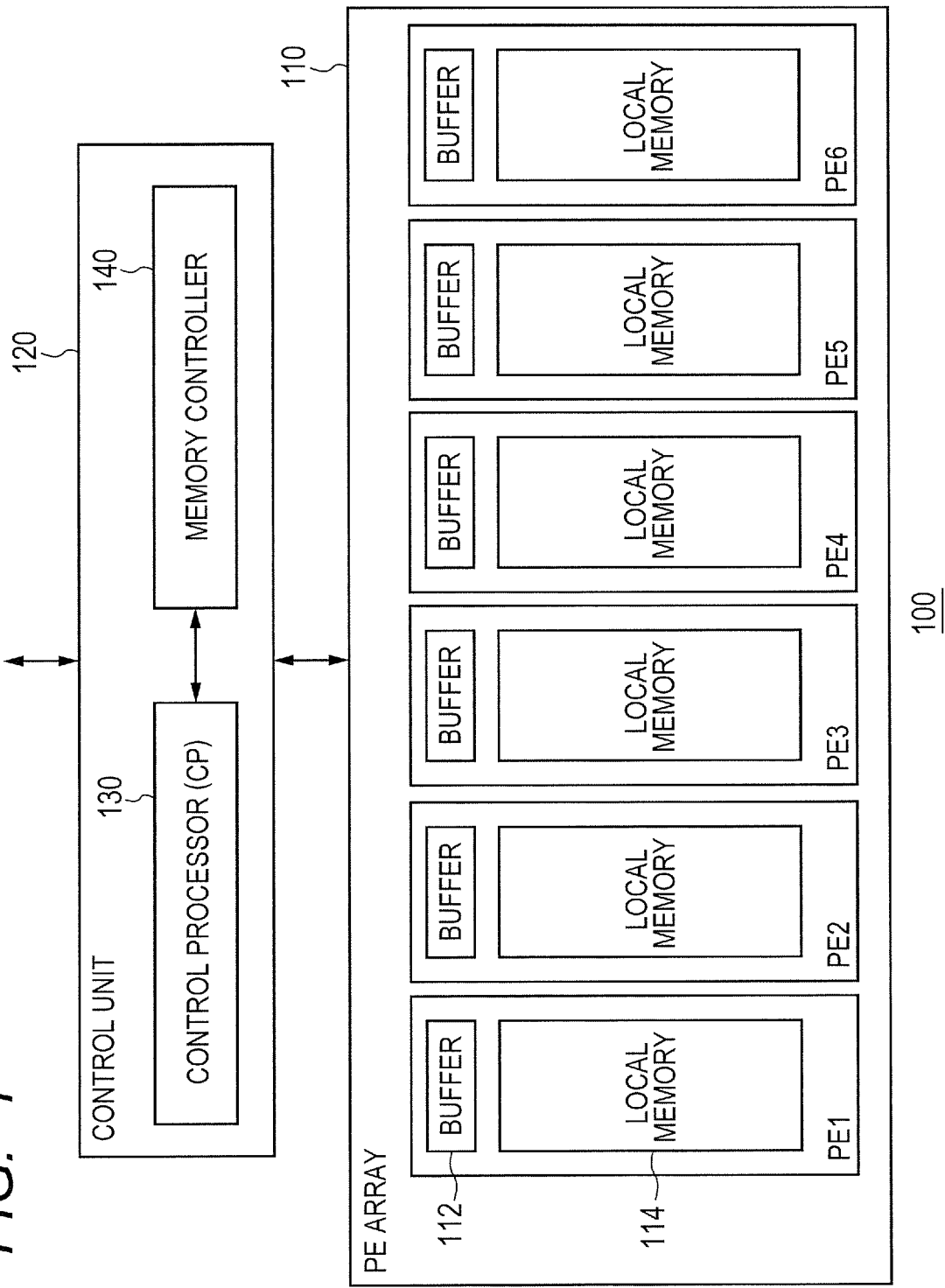
FIG. 1 is a block diagram showing the SIMD processor of the first embodiment of the present invention.

The embodiments of the present invention are described next while referring to the drawings. In order to clarify the invention, the drawings and description are abbreviated and omitted as needed from hereon. Each element described in the drawings as function blocks for the different processes can be readily understood by one skilled in the art as achievable by various combinations of hardware and software (programs) and are not limited by the hardware or software. In each of the drawings the same reference numerals are assigned to the same elements and redundant descriptions are omitted as necessary.

The above described program is storable and may be provided to a computer by utilizing various types of non-transitory computer readable mediums. Non-transitory computer readable mediums also include a variety of tangible storage medium types. Examples of non-transitory computer readable mediums include magnetic recording mediums (for example, flexible disks, magnetic tape, hard disk drives), opto-magnetic recording medium (for example, opto-magnetic disks), CD-ROM (Read Only Memory) CD-R, CD-R/W, semiconductor memories (for example, mask ROM, PROM (Programmable ROM), EPROM (Erasable PROM), flash ROM, RAM (Random Access Memory)). Moreover the programs may also be supplied to the computer by transitory computer readable mediums. Examples of transitory computer readable mediums include electrical signals, optical signals, and electromagnetic waves. These transitory computer readable mediums may be provided as programs to the computer by way of cable communication paths such as electrical lines or optical fibers, or by wireless (radio) communication paths.

First Embodiment

FIG. 1 shows an SIMD processor 100 of the first embodiment of the present invention. The SIMD processor 100 is comprised of a PE array 110, and a control unit 120.

The PE array 110 is comprised of N number (N is an integer of 2 or more and in this case N=6) of processor elements (PE) 1 to 6. Each PE possesses the same structure and so the PE1 is utilized as a representative example here.

The PE1 is comprised of a local memory 114, and a buffer 112 to temporarily store data exchanged with the external memory. The buffer 112 capacity is a specified unit size S. The display of function blocks such as the arithmetical units normally configuring this type of PE are omitted from the drawing.

A control processor (CP) 130 described later in the control unit 120 controls the PE1. When exchanging data with the external memory, the PE1 reads out the applicable data from the local memory 114 according to the read command from the CP130 and stores that data in the buffer 112, and reads out data stored in the buffer 112 according to the write command from the CP130 and writes that data into the applicable address number in the local memory 114.

The control unit 120 is comprised of the CP130, and the memory controller 140. The CP130 controls the PE array 110, and the memory controller 140.

After receiving a data transfer instruction (hereafter, simply called a transfer instruction) from the CP130, the memory controller 140 executes DMA transfer of data exchanged between the external memory, and each PE in the PE array 110. The memory controller 140 is described while referring to FIG. 2.

Figure 2:
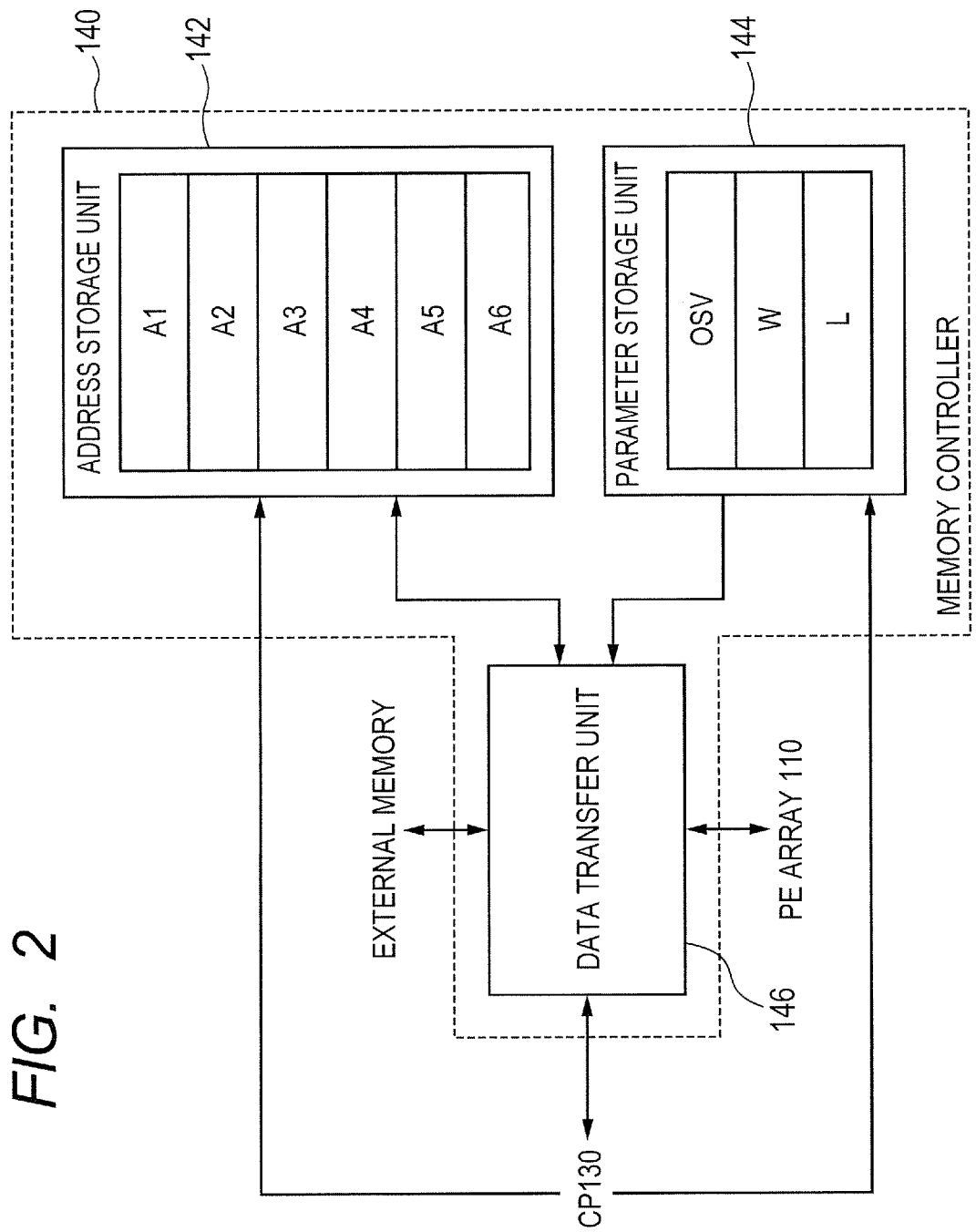
FIG. 2 is a block diagram showing the memory controller in the SIMD processor shown in FIG. 1.

The memory controller 140 as shown in FIG. 2, is comprised of an address storage unit 142, a parameter storage unit 144, and a data transfer unit 146.

The address storage unit 142 is capable of setting N number (here six) of addresses Ai (i=1 to 6) by way of the CP130 into the external memory. The data transfer unit 146 is capable of changing the address Ai stored in the address storage unit 142.

The parameter storage unit 144 is capable of setting a first parameter OSV, a second parameter W, and a third parameter L by way of the CP130.

The data transfer unit 146 transfer data between the external memory and the buffer 112 of PE1 to PE6 according to the transfer instruction from the CP130. During transfer of the applicable data, the data transfer unit 146 performs the first process repeatedly by a number of times matching the third parameter L stored in the parameter storage unit 144 based on the content in the address storage unit 142 and the parameter storage unit 144.

The first process is a process to carry out the fourth process along with the second process after repeating a third process along with the second process for M number of times as shown in formula (6).

$$M = W/S - 1 \quad (6)$$

Here, W denotes the second parameter stored in the parameter storage unit 144, and S denotes the unit size.

The second process is a process to read out S-sized unit portions of data from each address stored in the address storage unit 142 so that the one address corresponds to one PE, and to store that data in the corresponding buffer 112 of the PE, during data transfer to the PE array 110 (more specifically, the buffers 112 in each PE in the PE array 110) from the external memory.

During the transfer of data from the PE array 110 to the external memory, the second process reads out data stored in the buffer 112 in each of the PE, and writes that data in the corresponding address among the six addresses stored in the address storage unit 142 so that one address corresponds to one processor element.

The third process is a process for increasing each address Ai stored in the address storage unit 142 in accordance with formula (7).

$$Ai = Ai + S \quad (7)$$

Here, Ai denotes i-th address stored in the address storage unit 142, and S denotes the unit size.

The fourth process is a process for increasing each address Ai stored in the address storage unit 142 in accordance with formula (8).

$$Ai = Ai + OSV \quad (8)$$

Here, Ai denotes the i-th address stored in the address storage unit 142, and OSV denotes the first parameter stored in the parameter storage unit 144.

During the transfer of data to the PE array 110 from the external memory, the CP130 issues a write command to the PE1 to PE6 whenever all the buffers 112 in the PE1 to PE6 are full. Moreover, the transfer of data to the external memory from the PE array 110, the CP130 issues a read command to the PE1 to PE6 whenever all the buffers 112 in the PE1 to PE6 are empty.

The SIMD processor 100 of the present embodiment is for example capable of suppressing a drop in SIMD processor efficiency when exchanging data in the plural rectangular regions of two-dimensional data in which the plural S-sized data units are arrayed two-dimensionally between an external memory section and a plurality of PE contained in the applicable SIMD processor 100, so that one rectangular region corresponds to one PE.

Figure 13:
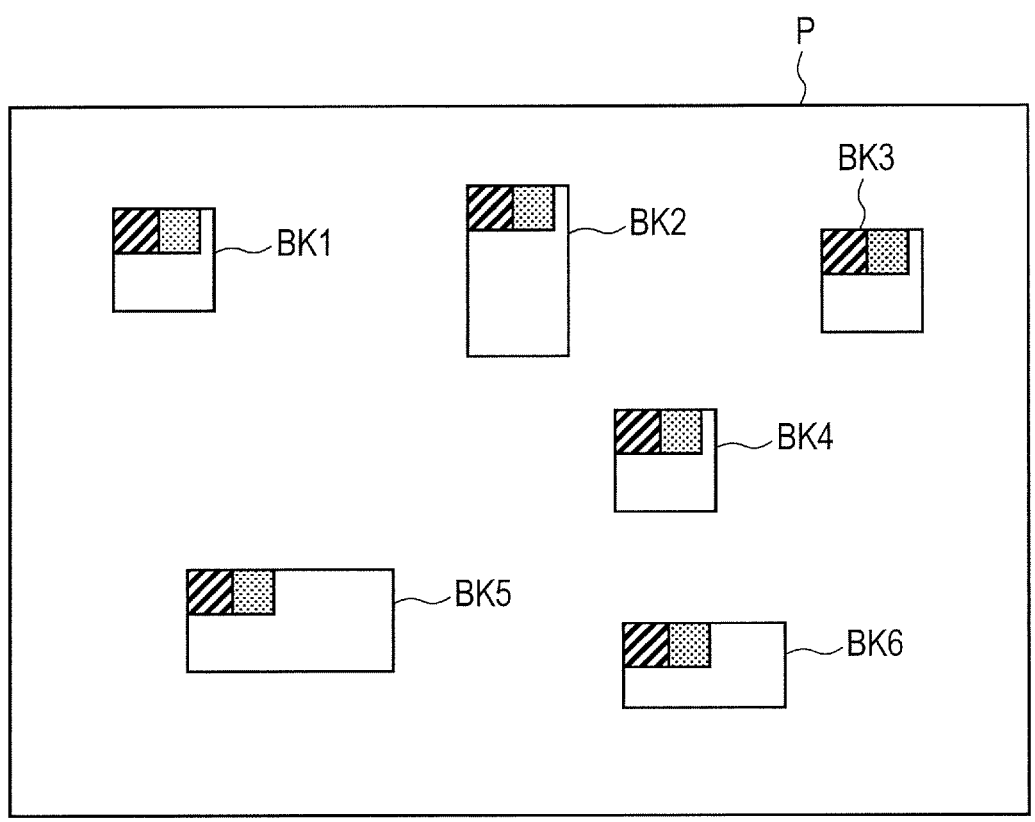
FIG. 13 is a drawing for showing the image serving as an example of two-dimensional data.

The flow in the process for writing data of the six rectangular regions (rectangular regions BK1 to BK6) from the external memory section into each of the local memories 114 in the PE1 to PE6 in PE array 110 is described using the two-dimensional data of the image P shown in FIG. 13 as a specific example.

The CP130 first of all sets the parameter setting unit 144 and the address storage unit 142 of the memory controller 140.

The CP130 sets the beginning (or lead) address of the external memory for each of the rectangular region in the address storage unit 142. The CP130 in this way sets in the address storage unit 142 the beginning address of rectangular region BKi (i=1 to 6) as the address Ai (i=1 to 6).

The CP130 sets the difference in addresses of the beginning and end pixels in the same row for image P as the first parameter OSV, and sets the size in the row direction of the rectangular region as the second parameter W, and sets the number of rows in the data (pixels) contained within the rectangular region as the third parameter L in the parameter storage unit 144.

If the row direction sizes of the rectangular regions BK1 to BK6 are the same then the CP130 sets the applicable same size as the second parameter W; and if the row direction sizes of the rectangular regions BK1 to BK6 are different, then the CP130 sets the maximum value among these sizes as the second parameter W. For example, if using the six rectangular regions shown in FIG. 13, then the CP130 sets the row direction size of BK5 as the second parameter W.

If the number of rows of the rectangular regions BK1 to BK6 are the same, then the CP130 sets that applicable number of rows as the third parameter L. If the number of rows of the rectangular regions BK1 to BK6 are different, then the CP130 set the maximum value among the number of rows as the third parameter L. If using the using the six rectangular regions shown in FIG. 13, then the CP130 sets the number of rows of rectangular region BK2 as the third parameter L.

When the address storage unit 142 and parameter storage unit 144 are set, the CP130 issues a transfer instruction to the data transfer unit 146.

Figure 3:
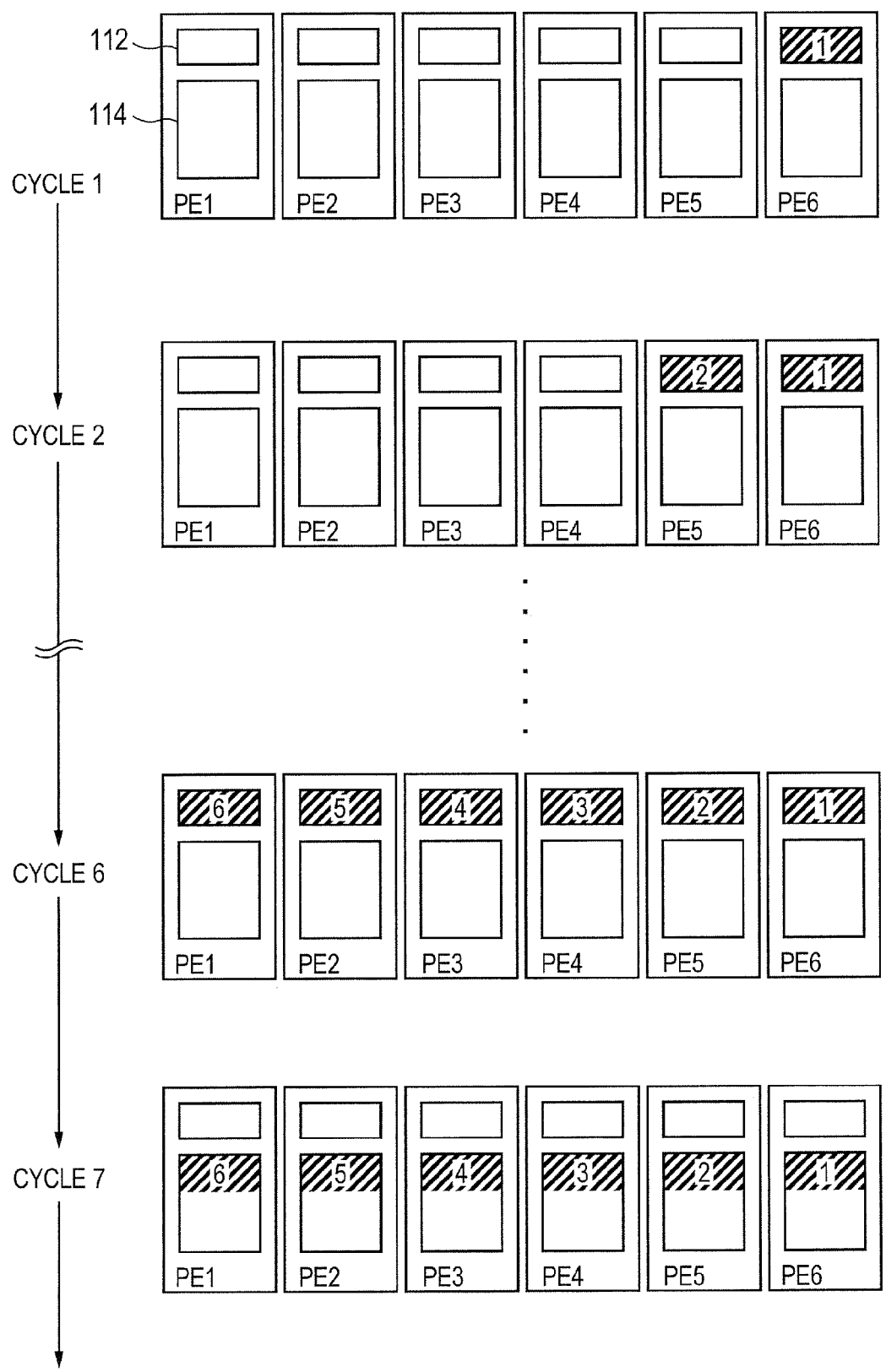
FIG. 3 is drawings for describing the operation of the SIMD processor shown in FIG. 1 (part 1)
Figure 4:
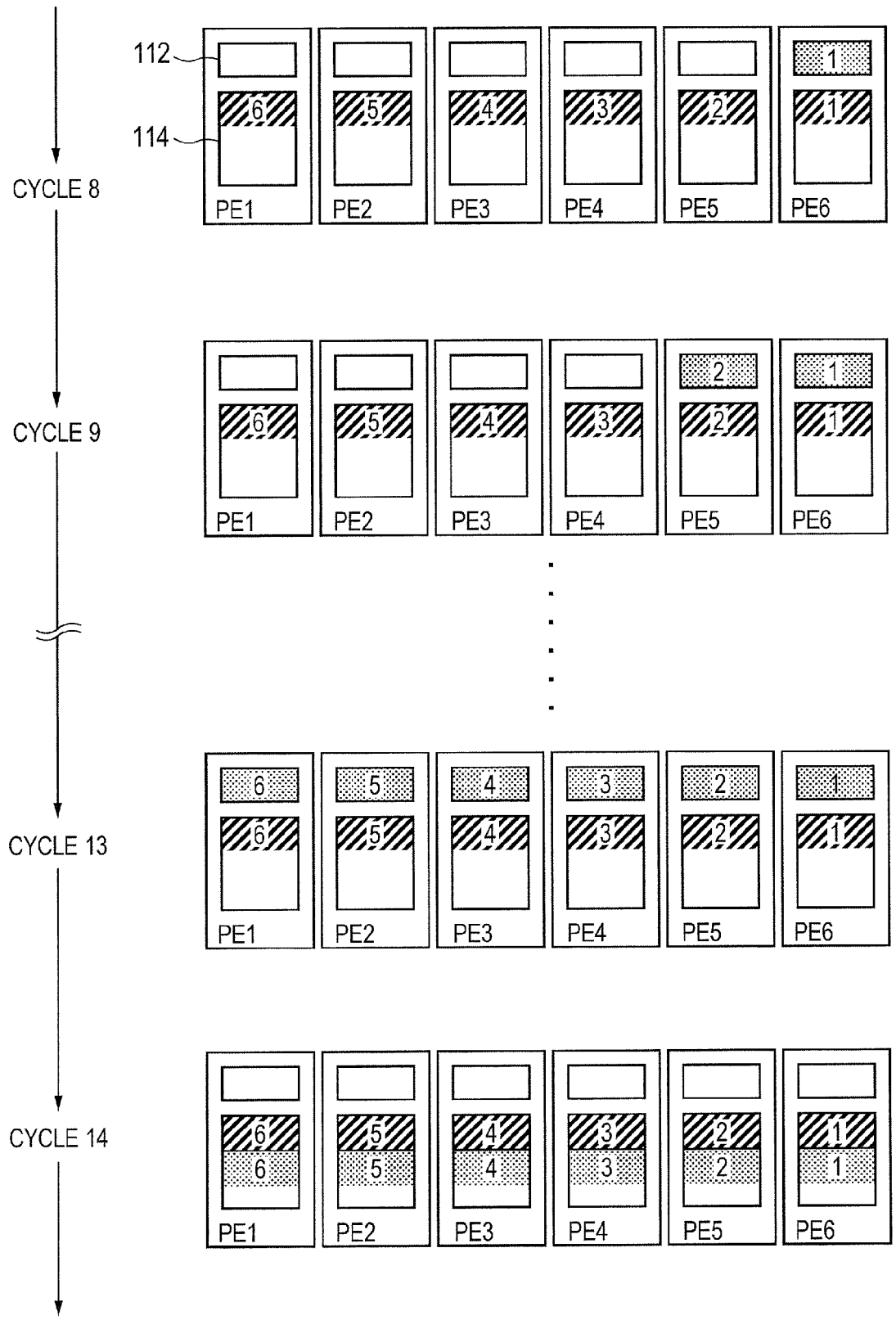
FIG. 4 is drawings for describing the operation of the SIMD processor shown in FIG. 1 (part 2)

When the transfer instruction from the CP130 is received, the memory controller 140 reads out the data from the external memory and stores that data in the buffers 112 of PE1 to PE6. This transfer is described while referring to FIG. 3 and FIG. 4. In FIG. 3 and FIG. 4, the small frame within the local memory 114 and the buffer 112 of each PE indicates the pixels; and the numeral within the frame indicating the pixels is the number (No.) of the rectangular region to which the applicable pixel belongs. For example, the first (number 1) pixel of rectangular region BK1 stored in the buffer 112 of PE6 is shown at the uppermost section in FIG. 3.

As shown in FIG. 3, in the first cycle (cycle 1 in the figure) after receiving the transfer instruction from the CP130, the data transfer unit 146 in the memory controller 140 reads out a one-pixel portion of data stored in the address A1 stored in the address storage unit 142 from the external memory and stores that data in the buffer 112 of PE6. The data transfer unit 146 in this way transfers the first (number 1) pixel of the rectangular region BK1 to the buffer 112 in PE6.

Then, in the second cycle, the data transfer unit 146 reads out a one-pixel portion of data stored in the address A2 stored in the address storage unit 142 from the external memory, and stores that data into the buffer 112 in the PE5. The data transfer unit 146 in this way transfers the first (number one) pixel of the rectangular region BK2 to the buffer 112 in PE5.

Afterwards, the data transfer unit 146 repeats the process of reading out a one-pixel portion of data stored in the address Ai (i=3 to 6) stored in the address storage unit 142 from the external memory, and storing that data into the buffer 112 in the PEi (i=4 to 1) corresponding to the applicable address Ai (i=3 to 6). The first (number 1) pixel of rectangular region BK6 is consequently transferred to the buffer 112 in PE1 in the sixth cycle.

The process from cycle 1 through cycle 6 is equivalent to the first time of the second process previously described. Here, the data transfer unit 146 increases each address Ai (i=1 to 6) stored in the address storage unit 142 as the third process according to the formula (7). This formula (7) is shown once more to make the description easier to understand.

$$Ai = Ai + S \tag{7}$$

where Ai denotes the i-th address stored in the address storage unit 142, and S denotes the unit size.

The unit size "S" in formula (7) is here equivalent to the size of one pixel. Each address Ai (i=1 to 6) after increase therefore becomes the address of the second pixel in each rectangular region.

The data transfer unit 146 generates an interrupt because all of the buffers 112 in each PE have become full. The CP130 interrupts the arithmetic processing in the PE1 to PE6 and issues a write command according to the interrupt by the data transfer unit 146.

Each PE writes the data stored in the buffers 112, into the local memory 114 according to the write command from the CP130. In cycle 7, the first (number 1) pixel of each of the rectangular regions (BK1 to BK6) is written into each of the local memories 114 of the corresponding PE (PE6 to PE1) as shown in the figure.

The data transfer unit 146 then repeatedly performs the third process along with the second process.

As shown in FIG. 4, in cycle 8, the data transfer unit 146 transfers the second (number 2) pixel of the rectangular region BK1 into the buffer 112 of PE6. In cycle 9, the data transfer unit 146 transfers the second (number 2) pixel of the rectangular region BK2 into the buffer 112 of PE5.

The data transfer unit 146 continues the processing in the same way, transferring the second (number two) pixel of the rectangular region BK6 into the buffer 112 of PE1.

The process from cycles 8 through 13 is equivalent to the second execution of the second process. Here, along with issuing an interrupt, the data transfer unit 146 increases each of the addresses Ai (i=1 to 6) stored in the third address storage unit 142 according for formula (6) as the second execution of the third process. Each address Ai (i=1 to 6) stored in the address storage unit 142 is in this way becomes the lead (beginning) address of the third pixel in each rectangular region. Moreover, as shown in the figure in cycle 14, the second pixel of each rectangular region (BK1 to BK6) is respectively written into the local memory 114 of the corresponding PE (PE6 to PE1).

The data transfer unit 146 repeatedly executes the third process along with the second process M number of times as shown in formula (6). The formula (6) is shown once again to make the description easier to understand.

$$M = W/S - 1 \tag{6}$$

where W denotes the second parameter stored in the parameter storage unit 144, and S denotes the unit size.

The second parameter W is the maximum size along the row direction of the rectangular region, and the unit size S is the size of one pixel so the M shown in formula (6) is a value where one is subtracted from the largest number of pixels in the row direction of the rectangular region. In other words, after repeatedly executing the third process along with the second process M number of times, each of the addresses Ai stored in the address storage unit 142 becomes the address of the last pixel among the pixels that must be transferred to the applicable row for that applicable rectangular region.

After repeatedly executing the third process along with the second process M number of times, the data transfer unit 146, along with the second process, executes a fourth process which is the increasing of each address Ai stored in the address storage unit 142 according to the formula (8). The formula (8) is shown once again to make the description easier to understand.

$$Ai=Ai+OSV \quad (8)$$

where Ai denotes the i-th address stored in the address storage unit 142, and OSV denotes the first parameter stored in the parameter storage unit 144.

As already described, the first parameter OSV is the difference between the lead and end pixel addresses in the same row of the image P and so the fourth process makes each of the addresses Ai stored in the address storage unit 142 become the first (number one) pixel address of the next row in each rectangular region.

The process from the first execution of the second process to the end of the first execution of the fourth process is equivalent to the previously described first process. The data transfer unit 146 repeats this first process on the times of the third parameter L stored in the data transfer unit 146. The third parameter L is the largest number of rows in the rectangular region, so the data of each rectangular region (BK1 to BK6) are transferred into the local memory 114 of the corresponding PE (PE6 to PE1) as the results from writing into the parameter storage unit 144 each time the buffer 112 in each of the PE become full in addition to repeating the first process at the L times.

The case of the data transfer unit 146 transferring data from the external memory to the PE array 110 has been described while referring to FIG. 3 and FIG. 4. Other than the point that the CP130 issues a transfer instruction to the memory controller 140 after a read command is sent to the PE array 110; the point that the CP130 sends a read command to the PE array 110 each time all the buffers 112 in each PE become empty; and the point that the data transfer direction of the second process is opposite that described above, the transfer of data from the PE array 110 to the external memory is identical to the transfer of data from the external memory to the PE array 110 and so a detailed description is omitted.

In the SIMD processor 100 of the first embodiment, data is in this way transferred by the CP130 issuing a one-time transfer instruction, and the memory controller 140 transferring the respective rectangular region data between the external memory and the buffers 112 in the PE corresponding to the applicable rectangular region. The CP130 can issue instructions to the PE array 110 during transfer by the memory controller 140 so that there are no stoppages in the arithmetical processing in any PE within the PE array 110. The embodiment can therefore suppress a drop in SIMD processor efficiency when exchanging two-dimensional data among data in the plural rectangular regions, between an external section and a plurality of processor elements of an SIMD processor, so that one rectangular region corresponds to one processor element.

In the SIMD processor 100 of this embodiment, the buffers 112 in each PE of the PE array 110 are shown as mutually autonomous function blocks. However, these buffers may for example be utilized as different regions in the same buffer.

Moreover, each of the buffers 112 in the SIMD processor 100 are configured to write data separately. However, these buffers 112 may for example be configured as one shift register. This configuration is described in the second embodiment.

Second Embodiment

Figure 5:
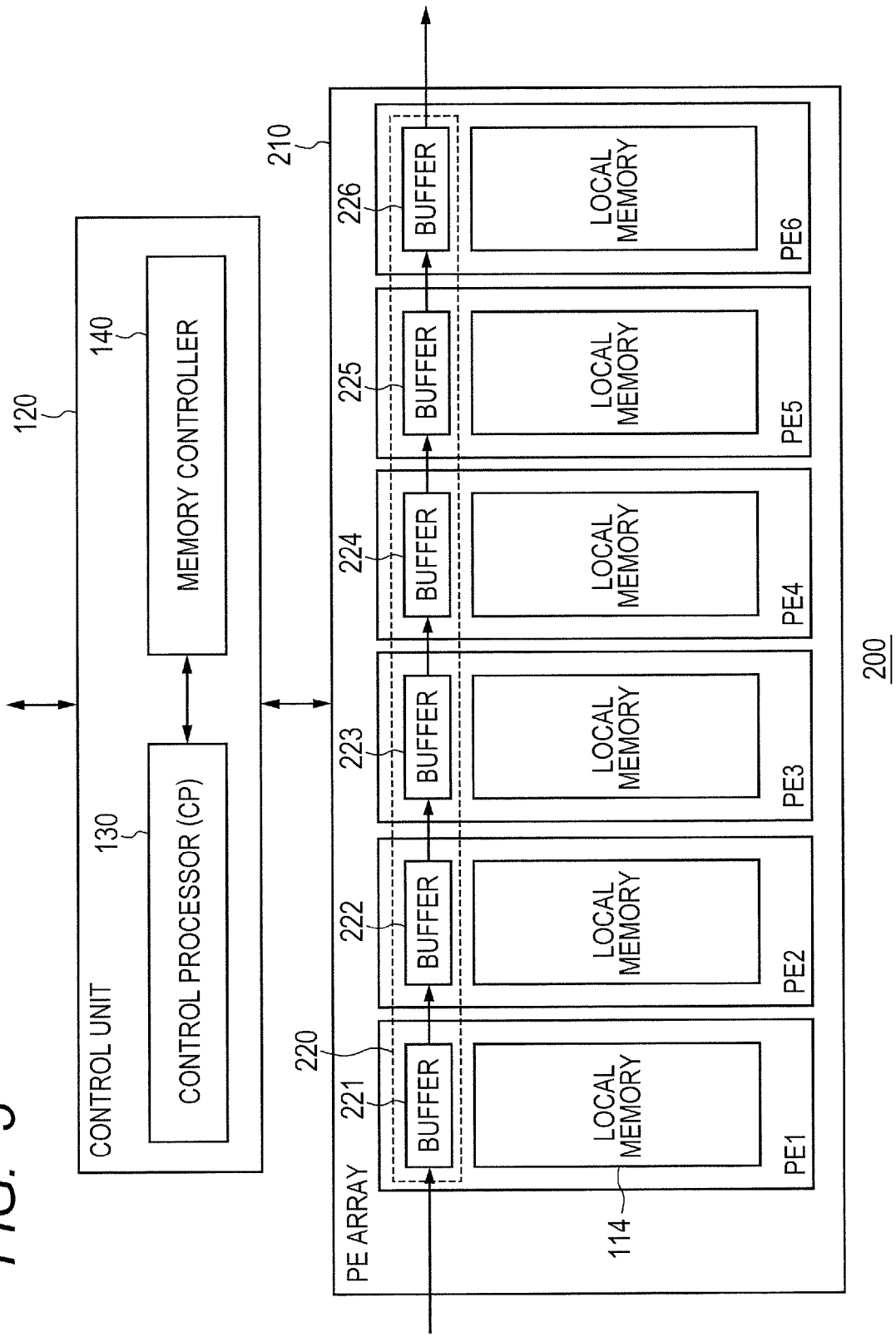
FIG. 5 is a block diagram showing the SIMD processor of the second embodiment of the present invention.

FIG. 5 is a block diagram showing the SIMD processor 200 of the second embodiment of the present invention. Other than the point that a PE array 210 is installed instead of a PE array 110, the applicable SIMD processor 200 possesses a structure identical to the SIMD processor 100 shown in FIG. 1. Except for the point that the shift registers 220 are installed instead of each PE buffer 112, the PE array 210 possesses a structure identical to the PE array 110 in the SIMD processor 100. The description of the SIMD processor 200 therefore only describes in detail those points differing from the SIMD processor 100. Examples of processing by the SIMD processor 200 also utilize the transfer of rectangular region data for the image P shown in FIG. 13 to each PE in the PE array 210, the same as utilized when describing the SIMD processor 100.

The shift register 220 is comprised of the same number of stages (here six stages) as the number of PE contained in the PE array 210. Each stage (first stage 221 to sixth stage 226) in the shift register 220 is in S-sized units (here, the size of one pixel in the image P). The shift register 220 shifts data towards the output end (sixth stage 226) each time that data is input to the input end of the shift register 220 (first stage 221). Each stage (first stage 221 to sixth stage 226) of the shift register 220 corresponds to each PE (PE1 to PE6) and each PE is capable of reading out and writing data in a stage corresponding to itself.

In order to write data in the six rectangular regions (rectangular regions BK1 to BK6) for the image P shown in FIG. 13 from the external memory to the local memory 114 of the PE1 to PE6 in PE array 210, the CP130 first of all makes the address storage unit 142 and parameter storage unit 144 settings in the memory controller 140. After making the settings, the CP130 issues a transfer instruction to the memory controller 140.

After receiving the transfer instruction from the CP130, the memory controller 140 reads out data from the external memory and sequentially inputs that data into the SIMD processor 200. This action is described next while referring to FIG. 6 and FIG. 7.

Figure 6:
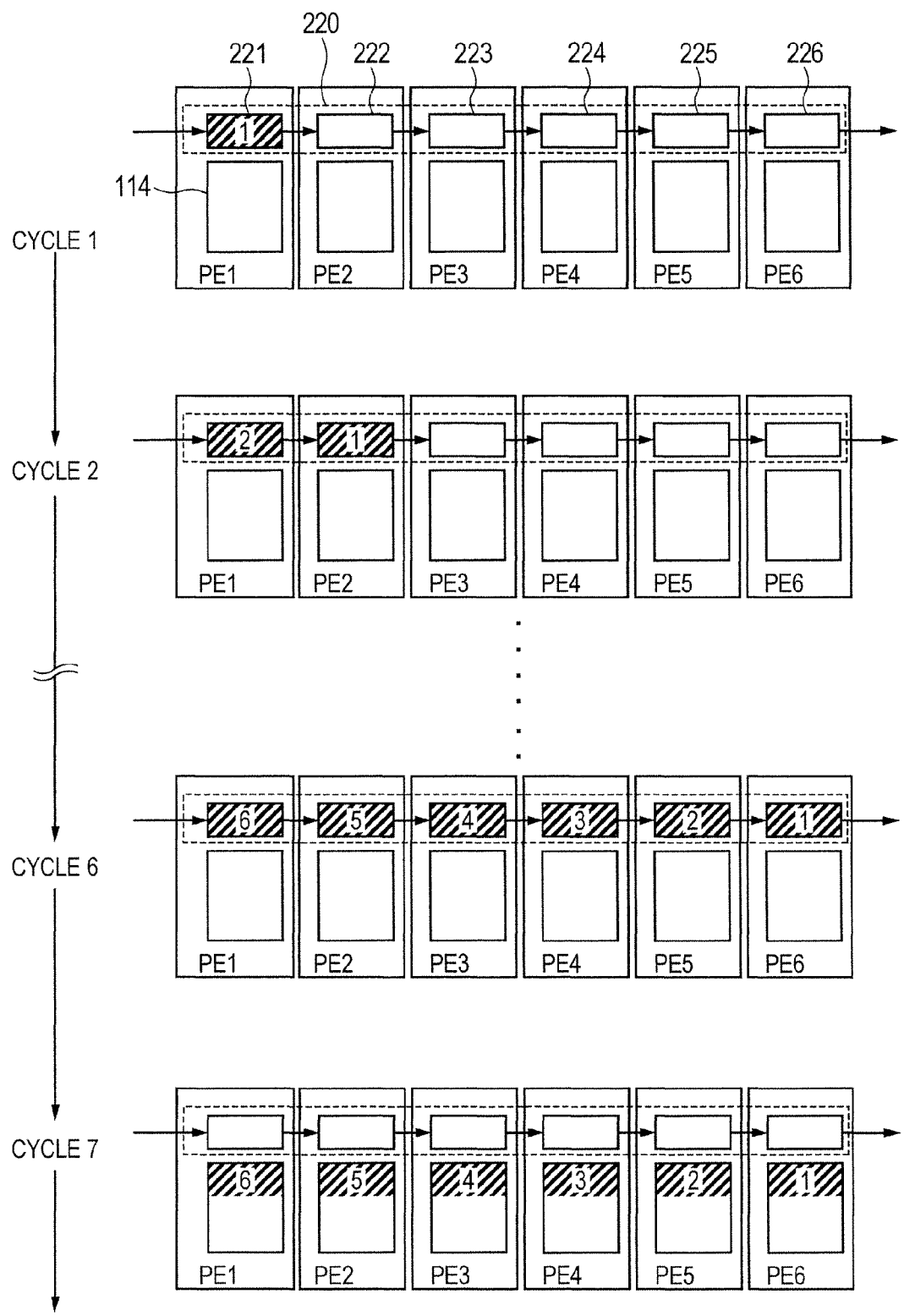
FIG. 6 is drawings for describing the operation of the SIMD processor shown in FIG. 5 (part 1)

As shown in FIG. 6, after the transfer instruction from the CP130, the data transfer unit 146 in the memory controller 140 reads out, from the external memory, a one-pixel portion of data stored in the address A1, stored in the address storage unit 142 and inputs that data into the shift register 220 in the first cycle (cycle 1 in the figure). The transfer unit 146 in this way stores the first pixel of rectangular region BK1 into the first stage 221 of the shift register 220.

Then in the second cycle, the data transfer unit 146 reads out from the external memory, a one-pixel portion of data stored in the address A2 stored in the address storage unit 142 and inputs that data into the shift register 220. The data transfer unit 146 in this way stores the first pixel of the rectangular region BK2 into the first stage 221 of the shift register 220, and the first pixel of the rectangular region BK1 is stored by shifting to the second stage 222.

In the cycles from 1 through 6, or in other words at completion of the first execution of the second process, each of the first (number 1) pixels in the rectangular region BK1 to BK6 are stored in each of the six stages 226 through the first stage 221 in the shift register 220. Moreover, each address Ai within the address storage unit 142 is increased by one pixel size.

In cycle 7, each PE writes data stored in its own corresponding stage of the shift register 220 into the local memory 114 in response to a write command from the CP130. The first (number 1) pixels in the each of rectangular region BK1 to BK6 are in this way written into the local memories 114 of each of the corresponding PE (PE6 to PE1).

Figure 7:
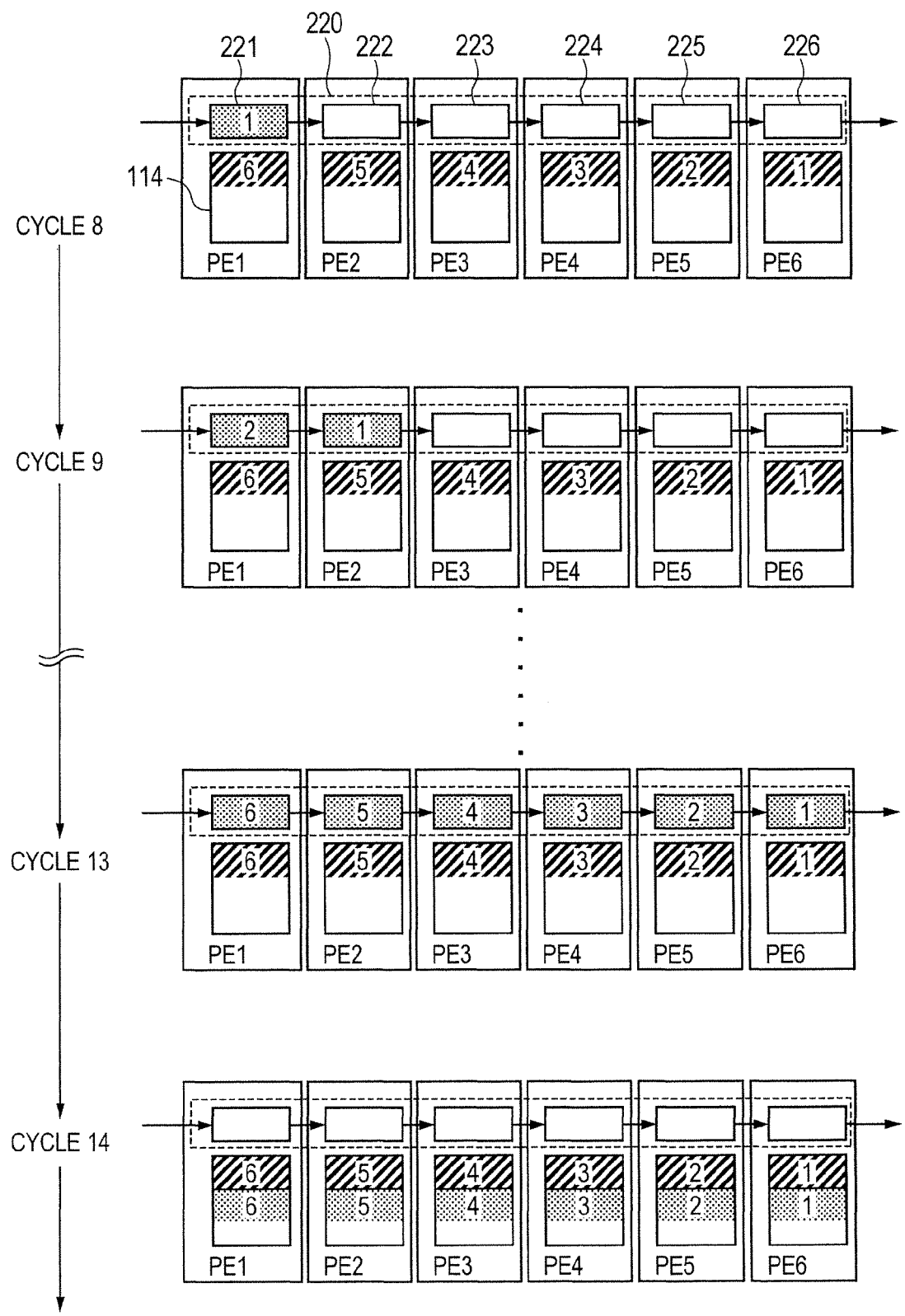
FIG. 7 is drawings for describing the operation of the SIMD processor shown in FIG. 5 (part 2)

Next, in cycle 8 as shown in FIG. 7, the second (number 2) pixel of the rectangular region BK1 is input to the first stage 221 of the shift register 220 and stored in the first stage 221. Then in cycle 9, the second pixel of rectangular region BK2 is input to the first stage 221 of the shift register 220, and stored in the first stage 221. The second pixel of the rectangular region BK1 is at the same time stored by shifting to the second stage 222.

The process continues in the same way and in cycle 13, the second pixel of rectangular region BK6 is input to the first stage 221 of the shift register 220, and stored in the first stage 221. The second pixel of the rectangular regions BK5-BK1 is at the same time stored by shifting into each of the sixth stages 226 through the second stage 222. Moreover, each address Ai within the address storage unit 142 is increased by one pixel size.

In cycle 14, each PE writes data stored in its own corresponding stage of the shift register 220 into the local memory 114 in response to a write command from the CP130. The second (number 2) pixels in each of the rectangular regions BK1 to BK6 are in this way written into the local memories 114 of each of the corresponding PEs (PE6 to PE1). In cycle 14, as shown in the figure, the second (number 2) pixels in each of the rectangular regions BK1 to BK6 are written into the local memories 114 of the corresponding PEs (PE6 to PE1).

Except for the point that the data transfer unit 146 inputs the data read out from the external memory into the first stage 221 of shift register 220, the process from here onwards is the same as the corresponding process by the SIMD processor 100 so a detailed description is omitted here.

Also even if the data transfer unit 146 is transferring data from the PE array 210 to the external memory, if the operation where the memory controller 140 in the SIMD processor 100 reads out data from each buffer 112, is substituted with the operation where the memory controller 140 in the SIMD processor 200 causes a data shift-out by the shift register 220 and also receives data shifted out from the sixth stage 226, then the operation of the SIMD processor 200 and the SIMD processor 100 are identical.

The SIMD processor of the present embodiment is capable of rendering the same effect as the SIMD processor 100.

Third Embodiment

Figure 8:
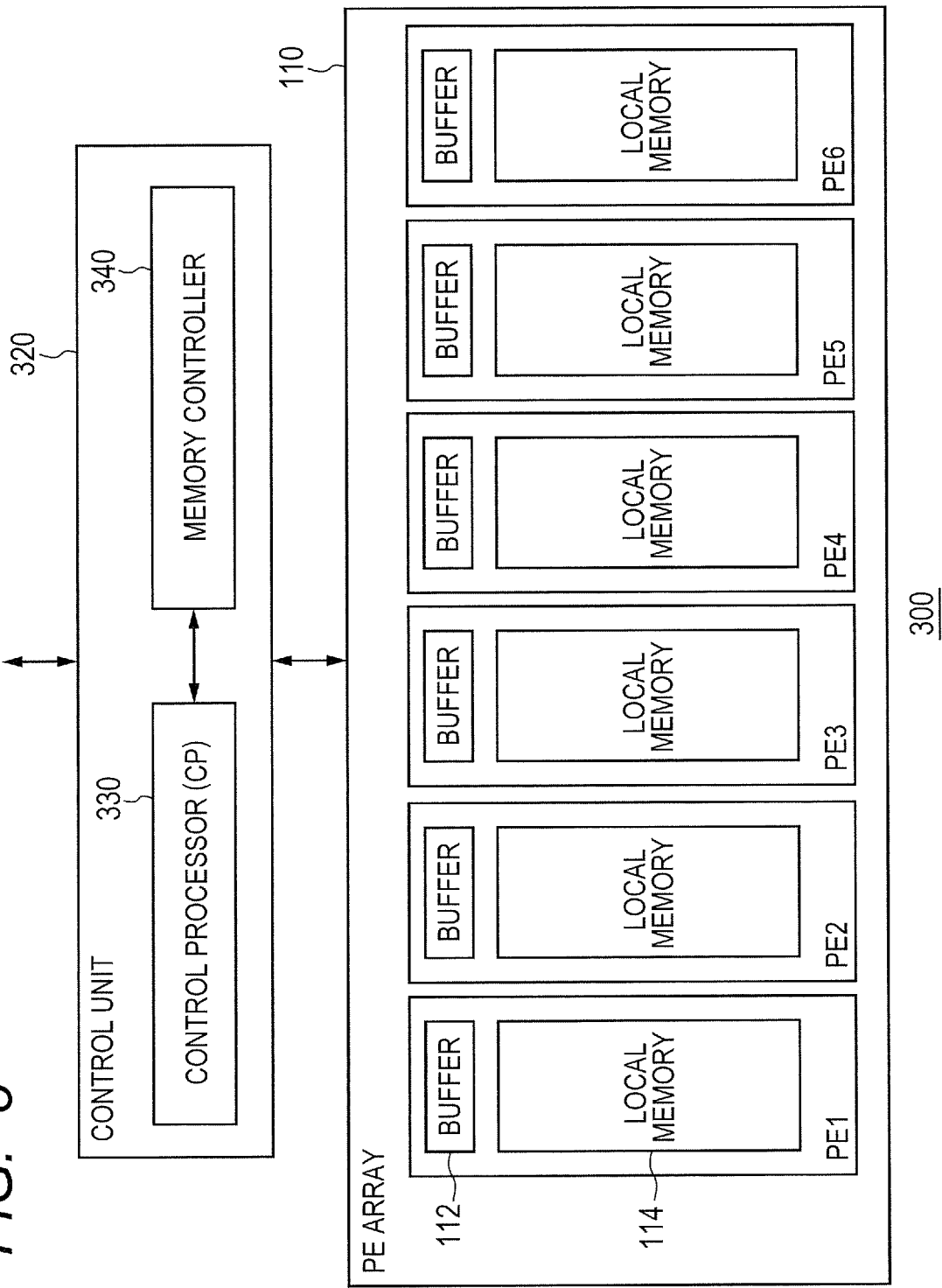
FIG. 8 is a block diagram showing the SIMD processor of the second embodiment of the present invention.

FIG. 8 is a block diagram showing the SIMD processor 300 of the third embodiment of the present invention. The SIMD processor 300 is comprised of a PE array 110, and a control unit 320. The PE array 110 is identical to the PE array 110 of the SIMD processor 100 shown in FIG. 1. The control unit 320 is comprised of a control processor CP330 and a memory controller 340.

Figure 9:
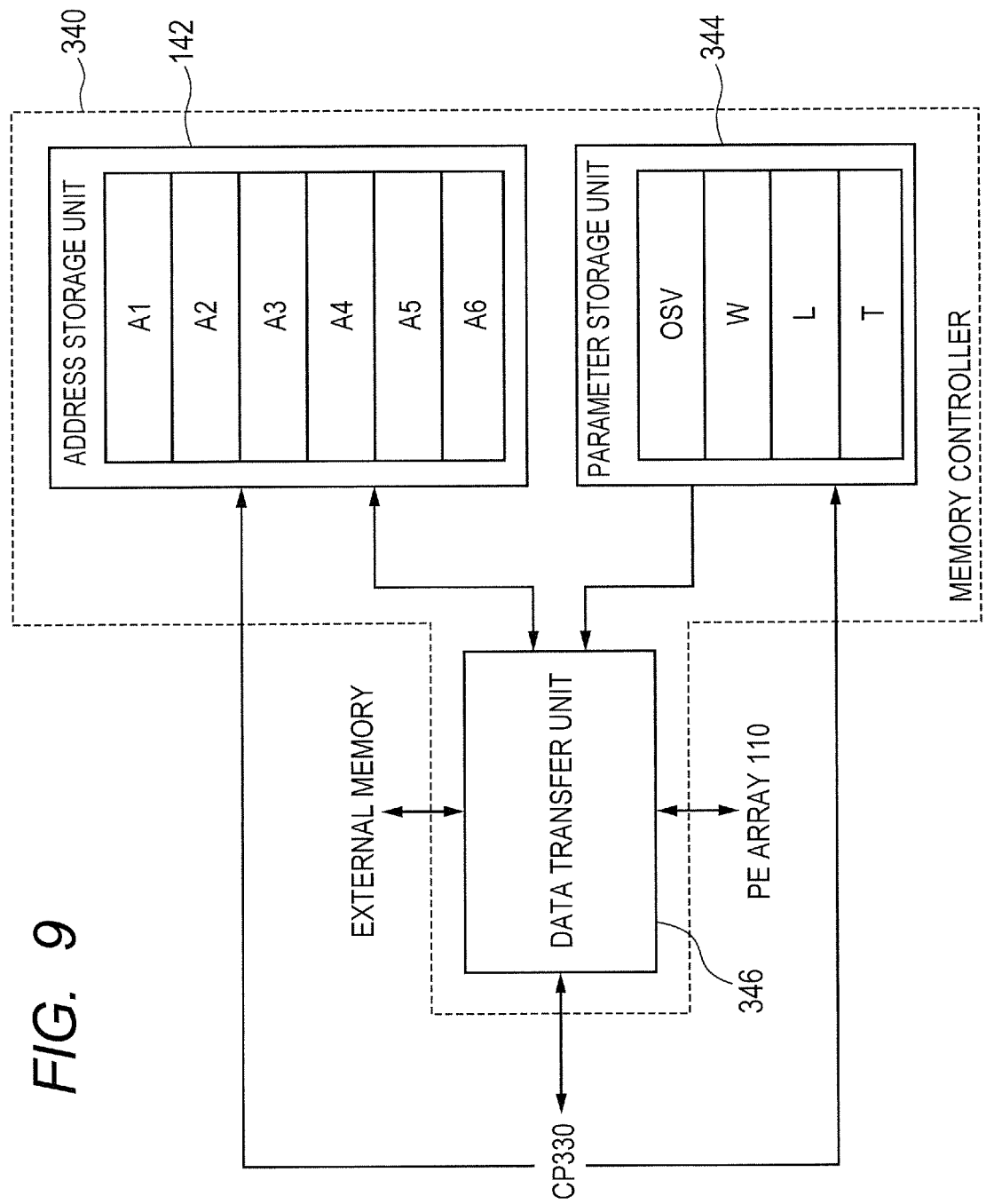
FIG. 9 is a block diagram showing the memory controller in the SIMD processor shown in FIG. 8.

FIG. 9 shows the memory controller 340. The memory controller 340 is comprised of an address storage unit 142, a parameter storage unit 344, and a data transfer unit 346.

The address storage unit 142 is identical to the address storage unit 142 of the memory controller 140 in the SIMD processor 100.

In addition to the first parameter OSV, the second parameter W, and the third parameter L, the parameter storage unit 344 is also capable of setting the fourth parameter T by way of the CP330.

The CP330 sets the address storage unit 142 and the parameter storage unit 344 for the transfer of data from the external memory to the PE array 110. The CP330 sets the divisor of the quantity N for the PE contained within the PE array 110 into the parameter storage unit 344 as the fourth parameter T. The quantity N here is 6 so the CP330 is capable of setting any of one 1, 2, 3 as the fourth parameter T.

The data transfer unit 346 transfers data between the external memory and the buffer 112 of the PE1 to PE6 according to the transfer instruction from the CP330. During transfer of the applicable data, the data transfer unit 346 repeatedly implements the first process for a number of times matching the third parameter L stored in the parameter storage unit 344, based on the content in the address storage unit 142 and the parameter storage unit 344.

In the description of the SIMD processor 100 and the SIMD processor 200, the first process has been described as executing the fourth process along with performing a second process after executing the third process along with performing the second process repeatedly M number of time as shown in formula (6).

In the SIMD processor 300 of the third embodiment, the first process is a process for executing the fourth process along with performing the second process; after repeatedly performing the third process along with the second process M1 times as shown in formula (9):

$$M1 = [W/(T \times S)] - 1 \qquad (9)$$

where W denotes the second parameter stored in the parameter storage unit 344, S denotes the unit size, and T denotes the fourth parameter stored in the parameter storage unit 344.

The second process and the third process are both different from the second process and third process described for the SIMD processor 100. The fourth process is identical to the fourth process described in the case of the SIMD processor 100.

First of all the second process is described. In the SIMD processor 300 of this embodiment, the second process is a process that repeats the fifth process T number of times.

During the transfer of data from the external memory to the PE array 110, the fifth process is a process that reads out each T times portion of data in S-sized units from addresses for "N/T" number of addresses among N number (here six) of addresses stored in the address storage unit 142; and also for "N/T" number of addresses that change each time, so that one address corresponds to T number of adjacent PEs; and respectively stores that data in the buffers 112 of T number of corresponding PEs.

Also, in the fifth process during transfer of data from the PE array 110 to the external memory, along with reading out data (data in S-sized units) stored in the buffers 112 of each PE so that one address corresponds to T number of adjacent PEs; the data readout from the buffers 112 in T number of adjacent PEs within each applicable group, among the groups comprised from T number of adjacent PEs is written into one address corresponding to the above group, among "N/T" number of addresses among N number of addresses stored in the address storage unit 142, and further among the "N/T" number of addresses that change each time.

In the SIMD processor 300 of the present embodiment, the third process is a process to increase each address Ai stored in the address storage unit 142 according to the formula (10):

$$Ai = Ai + S \times T \quad (10)$$

where Ai denotes i-th address, S denotes the unit size, and T denotes the fourth parameter stored in the parameter storage unit 344.

Namely in the SIMD processor 300, the one-time increase in the address Ai by the third process is T times the one-time increase in the address Ai in the third process executed by the SIMD processor 100.

The fourth process executed by the SIMD processor 300 in the present embodiment as previously described is identical to the fourth process described for the SIMD processor 100.

The CP330 is identical to the CP130 in the SIMD processor 100 in the point of sending a write command to the PE1 to PE6 whenever all the buffers 112 in PE1 to PE6 become full during the transfer of data from the external memory section to the PE array 110, and sending a read command to the PE1 to PE6 whenever all the buffers 112 in PE1 to PE6 become empty during the transfer of data from the PE array 110 to the external memory section.

The SIMD processor 300 moreover issues a data exchange instruction to the PE array 110, before instructing the memory controller 340 to transfer data, during the transfer of data from the PE array 110 to the external memory; and after completion of transferring applicable data during transfer of data from the external memory to the PE array 110.

This "data exchange" signifies an exchange of data among the local memories. Each PE in the PE array 110 exchanges data in the local memory with the adjacent PE.

The process flow in the SIMD processor 300 here is described using, as an example, the writing of data in the six rectangular regions (rectangular regions BK1 to BK6) in the image P shown in FIG. 13 from the external memory to each of the local memories 114 in the PE1 to PE6 in the PE array 110.

The CP330 first of all sets the parameter storage unit 344 and the address storage unit 142 in the memory controller 340.

The setting of the address storage unit 142 by the CP330 is identical to the setting performed by the CP130 in the SIMD processor 100.

The settings of the first parameter OSV, the second parameter W, and the third parameter L among the settings in the parameter storage unit 344 by the CP330 are identical to those settings performed by the CP130 in the SIMD processor 100.

The CP330 sets the divisor number of the PE, for example "2", contained within the PE array 110 into the parameter storage unit 344 as the fourth parameter T.

The CPU330 sends a transfer instruction to the data transfer unit 346 after setting the parameter storage unit 344 and the address storage unit 142.

After receiving the transfer instruction from the CP330, the memory controller 340 reads out the data from the external memory and stores that data into the buffers 112 of the PE1 to PE6. That process is described next while referring to FIG. 10 and FIG. 11.

Figure 10:
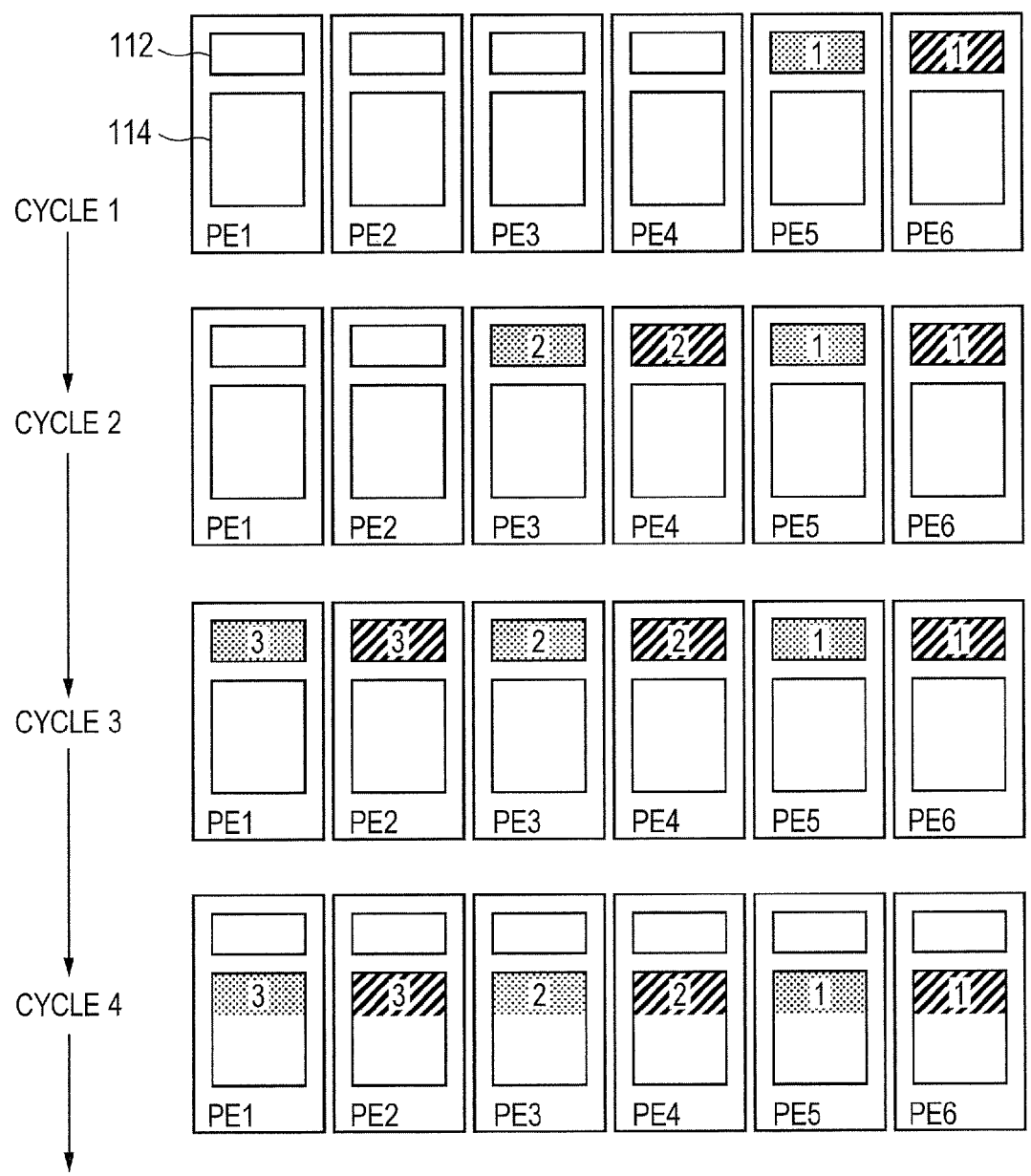
FIG. 10 is drawings for describing the operation of the SIMD processor shown in FIG. 8 (part 1)

As shown in FIG. 10, in the first cycle (cycle 1 in the figure) after receiving the transfer instruction from the CP330, the data transfer unit 346 reads out the T-pixel portion of data (here is two pixels) stored in the address A1 stored in the address storage unit 142 from the external memory, and stores that data respectively into the buffers 112 of PE6 and PE5. The data transfer unit 346 in this way transfers the first pixel of the rectangular region BK1 to the buffer 112 of PE6, and transfers the second pixel of the rectangular region BK1 to the buffer 112 of PE5.

Then in the second cycle (cycle 2), the data transfer unit 346 reads out a T-pixel portion of data stored in the address A2 stored in the address storage unit 142 from the external memory, and stores that data respectively into the buffers 112 of the PE4 and PE3. The data transfer unit 346 in this way transfers the first pixel of the rectangular region BK2 to the buffer 112 of PE4, and transfers the second pixel of the rectangular region BK2 to the buffer 112 of the PE3.

Next, in the third cycle (cycle 3), the data transfer unit 346 reads out a T-pixel portion of data stored in the address A3 stored in the address storage unit 142 from the external memory, and stores that data respectively into the buffers 112 in the PE2 and PE1. The data transfer unit 346 in this way transfers the first pixel of the rectangular region BK3 to the buffers 112 of PE2, and transfers the second pixel of the rectangular region BK3 to the buffer 112 of the PE1.

The process in cycles 1 through 3 is equivalent to the first execution of the fifth process previously described. Here, the data transfer unit 346 generates an interrupt since the buffer 112 of PE1 to PE6 have all become full. The CP330 then interrupts the arithmetical processing in PE1 to PE6, and sends a write command in response to this interrupt.

Each PE writes the data stored in the buffers 112 into the local memory 114 according to the write command from the CP330. In cycle 4 as shown in the figure, the first pixel of rectangular regions BK1 to BK3 is written into the respective local memories 114 of PE6, PE4, PE2, and the second pixel of rectangular regions BK1 to BK3 are written into the respective local memories of the PE5, PE3, PE1.

Figure 11:
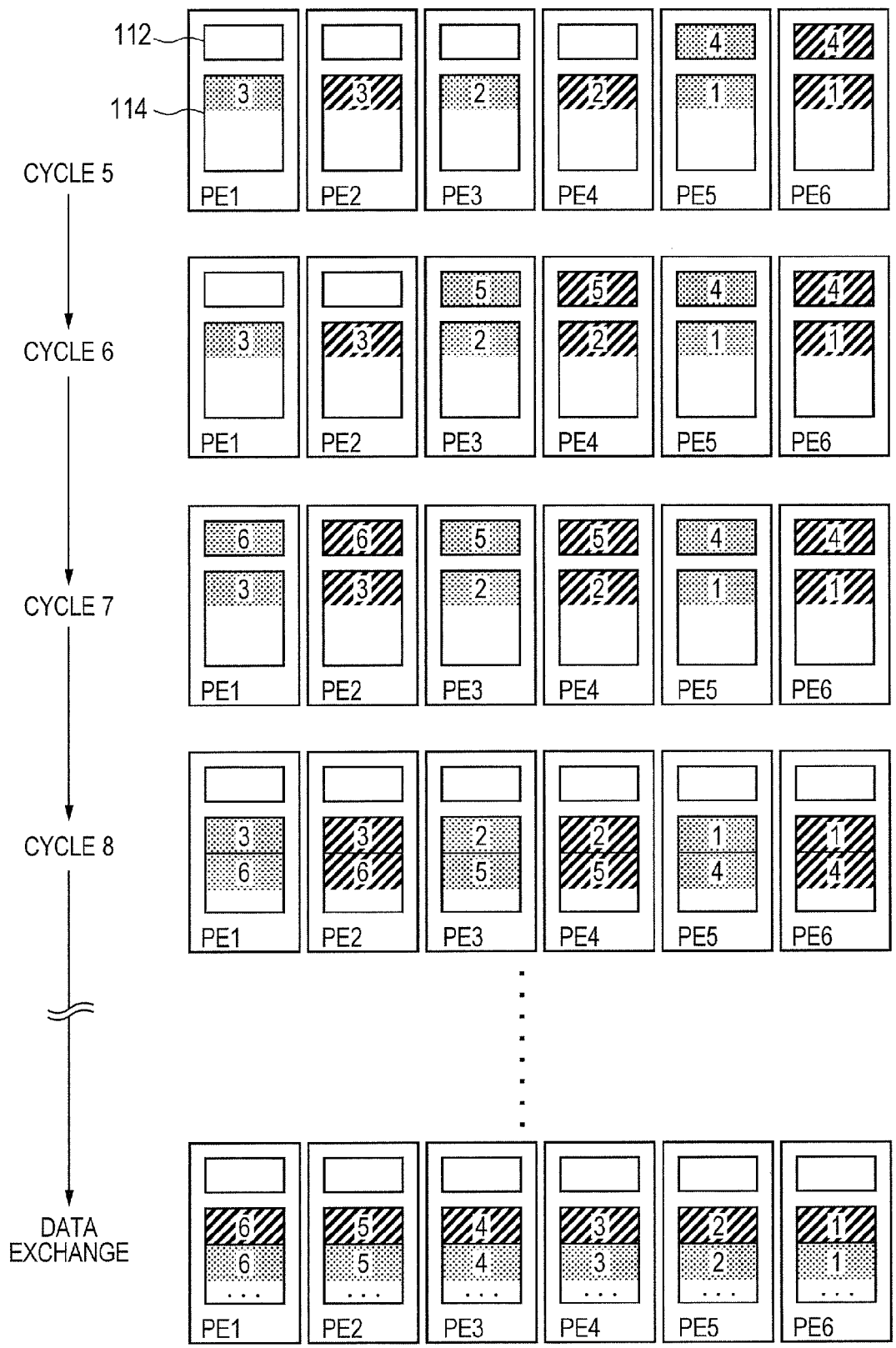
FIG. 11 is drawings for describing the operation of the SIMD processor shown in FIG. 8 (part 2)
Figure 12:
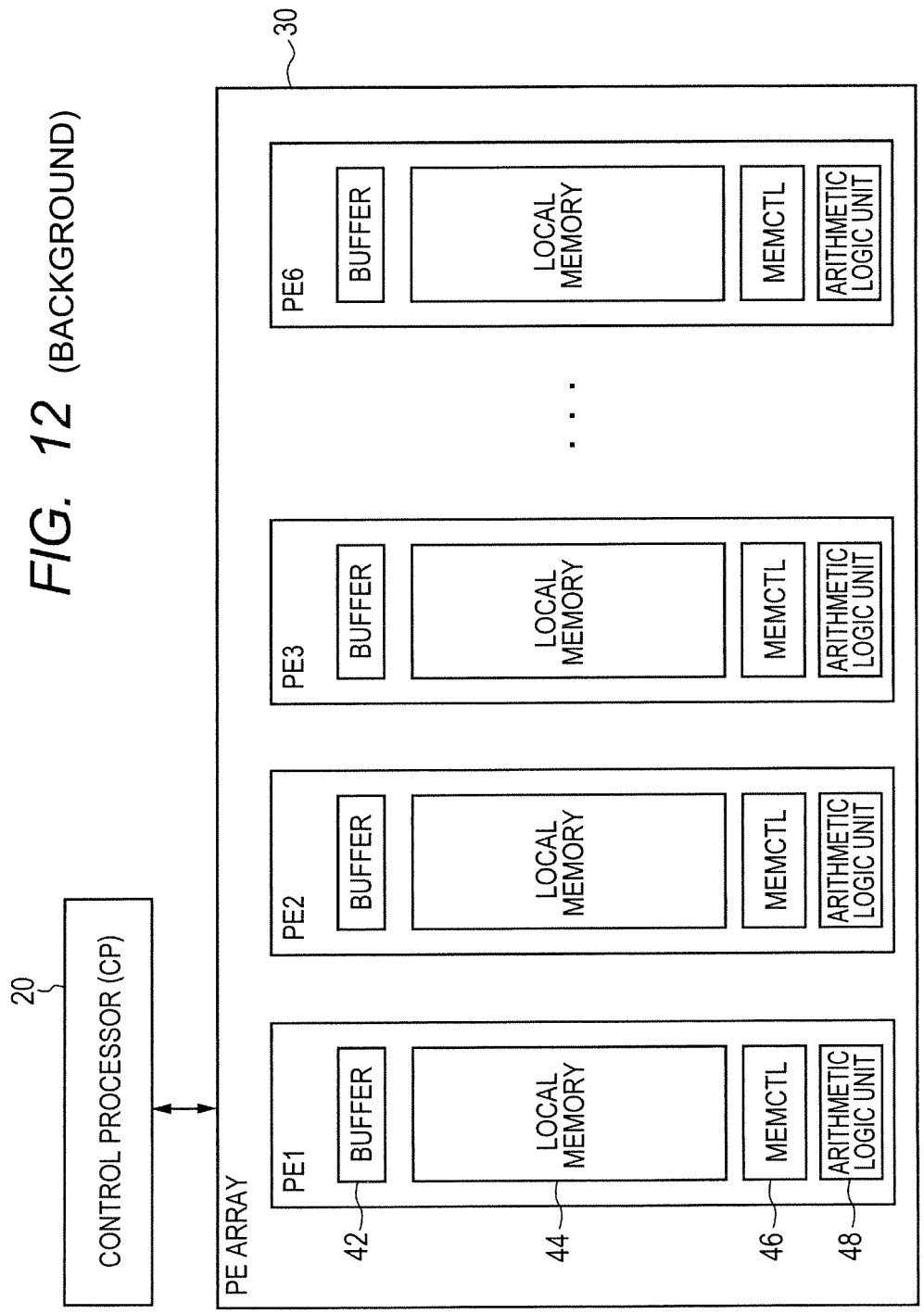
FIG. 12 is a block diagram for showing an example of the structure of an ordinary SIMD processor.

The data transfer unit 346 next performs the process in cycles 5 through 7 as shown in FIG. 11 as the second execution of the fifth process. As shown in the figure, the data transfer unit 346 transfers the first pixel of the rectangular region BK4 into the buffer 112 of PE6, and transfers the second pixel of rectangular region BK4 into the buffers 112 of PE5.

Then in cycle 6, the data transfer unit 346 transfers the first pixel of rectangular region BK5 to the buffer 112 of the PE4, and transfers the second pixel of rectangular region BK5 to the buffer 112 of PE3.

In cycle 7, the data transfer unit 346 transfers the first pixel of rectangular region BK6 to the buffer 112 of PE2, and transfers the second pixel of the rectangular region BK6 to the buffer 112 of PE1.

The fifth process is repeated T times (2 times), the data transfer unit 346 here increases each address Ai stored in the address storage unit 142 according to formula (10) as the third process. The formula (10) is shown once again to make the description easier to understand.

$$Ai = Ai + S \times T \quad (10)$$

where i denotes i-th address, S denotes the unit size, and T denotes the fourth parameter stored in the parameter storage unit 344.

The unit size "S" in the formula (10) is equivalent to the size of one pixel, and the fourth parameter T is set to "2". Each address Ai (i=1 to 6) after the increase therefore becomes the address of the third pixel of the rectangular regions BK1 to BK6.

The buffers 112 for PE1 to PE6 have all become full so the data transfer unit 346 again issues an interrupt. In response to this interrupt, the CP330 interrupts the arithmetical processing in PE1 to PE6, and sends a write command. In cycle 8 as shown in FIG. 11, the data transfer unit 346 in this way writes the first pixel of the rectangular regions BK4 to BK6 into the respective local memories 114 of PE6, PE4, and PE2, and writes the second pixel of the rectangular regions BK4 to BK6 into the respective local memories 114 of the PE5, PE3, and PE1.

The data transfer unit 346 then repeats the above described process M1 times. Here, the "M1" is the M1 shown in the previously described formula (9). Therefore, after the above described process is repeated M1 times, those pixels for the applicable row in each rectangular region that have still not been transferred from the external memory to the PE array 110 are a T number (here, 2 items) at the end; and the addresses Ai (i=1 to 6) stored in the address storage unit 142, for the applicable rectangular region, become the address of the lead (beginning) pixel among the two pixels at the end.

Here along with performing the second process, data transfer unit 346 increases the first parameter OSV portion in each address Ai (i=1 to 6) stored in the address storage unit 142 as the fourth process. The data transfer unit 346 in this way makes each address Ai stored in the address storage unit 142 become the lead (beginning) address in the next row of the corresponding rectangular region.

A process identical to the above described process is repeated for each row from the rectangular regions BK1 to BK6 onwards. Finally, the odd-numbered (first, third, etc.) pixels in the row direction for the rectangular regions BK1 to BK3 are stored the respective local memories 114 of PE6, PE4, PE2, and the even-numbered pixels are stored in the respective local memories 114 of PE5, PE3, and PE1.

Moreover, the odd-numbered (first, third, etc.) pixels in the row direction for the rectangular regions BK4 to BK6 are in the same way stored the respective local memories 114 of PE6, PE4, and PE2, and the even-numbered pixels are stored in the respective local memories 114 of PE5, PE3, and PE1.

The transfer of data from the external memory to the PE array 110 is completed in this way. However, the CP 330 sends a data exchange command to the PE array 110 so that all of the pixels in the same rectangular region are stored in the local memory 114 of the same PE.

Each PE in the PE array 110 exchanges data with the local memories among adjacent PE. For example, by exchanging the second pixel of rectangular region BK1 written into the local memory 114 of PE5 with the first pixel of the rectangular region BK4 written into the local memory 114 of PE6 between the PE5 and the PE6, the second pixel of rectangular region BK1 can be stored into the local memory 114 of PE6 the same as the first pixel of rectangular region BK1. The result from performing this type of data exchange between mutually PE adjacent PE in the PE array 110 is that, as shown in FIG. 11, the data for the rectangular region BK1 to BK6 is stored in each of the local memories of the corresponding PE (PE6 to PE1).

The above description described the case where the fourth parameter T is set to "2". However, the operation of the SIMD processor 300 is also identical to the operation of the SIMD processor 100 in the case where the fourth parameter T is set to "1".

If the fourth parameter T is set to "1" then the SIMD processor 300 of the present embodiment will render the same effect as the SIMD processor 100. If the fourth parameter T is set to "2" or higher, then in addition to the above described effect, the data transfer between the external memory and the PE array 110 can be performed at a higher speed.

The reason for the higher speed is that the data transfer unit 346 continuously reads out T-pixel portions of data in a one-time readout for one rectangular region on the external memory and transfers that data to the buffers 112 of the PE array 110. As is generally known, simultaneously accessing data in consecutive addresses normally provides good efficiency when accessing the external memory.

In this case, even though a process is required for storing the data from the same rectangular region into the local memory of the same PE after data transfer by the data transfer unit 346, this same process can be achieved just by exchanging the data among adjacent PE and so can be performed at high speed. The overhead accompanying this process is therefore small.

The present invention has been described based on the above embodiments. However, the embodiments are examples, and modifications, additions or deletions, or combinations of various types may be applied to the above described embodiments without departing from the purpose of the present invention. The fact that the variations implemented by these modifications, additions or deletions, or combinations are within the scope of the present invention can be readily understood by one skilled in the art.

For example, in the above described embodiments, the size along the row direction of the rectangular regions is set as the second parameter W. However, another value such as the number of pixels along the row direction of the rectangular region may for example be set as the second parameter W.

Also, the operation of the above described embodiments has been described for the case of images. However, the technology of the present invention may also be applied to the processing of two-dimensional data other than images.

What is claimed is:

1. A memory controller installed in an SIMD (Single Instruction Multiple Data) processor including N (N is an integer of 2 or more) number of processor elements having a capacity in S sized-units and a buffer to temporarily store data being transferred between an external memory and the applicable processor elements;

the memory controller comprising:
an address storage unit capable of setting N number of addresses Ai (i=1 through N) in the external memory; and
a parameter storage unit capable of setting a first parameter OSV, a second parameter W, and a third parameter L; and
a data transfer unit to transfer data between the buffers for the N number of processor elements and the external memory;
wherein the data transfer unit repeatedly executes a first process a certain number of times matching the third parameter L stored in the parameter storage unit according to instructions of the data transfer,
wherein the first process is a process that executes a fourth process along with a second process after repeatedly executing a third process along with a second process M times as shown in the formula (1);
wherein the second process is a process that during the transfer of data from the external memory to buffers in the N number of processor elements, reads out data in S-sized unit portions from each address stored in the address storage unit and stores that data in the buffer of the corresponding processor element, so that one address corresponds to one processor element;
wherein the second process is also a process that during transfer of data from buffers in the N number of processor elements to the external memory, reads out data stored in the buffers of each of the processor elements and writes that data into the corresponding address among N number of addresses stored in the address storage unit, so that one address corresponds to one processor element;
wherein the third process is a process that increases each address Ai stored in the address storage unit according to the formula (2); and
wherein the fourth process is a process that increases each address Ai stored in the address storage unit according to the formula (3);

$$M=W/S-1 \qquad (1)$$

where W denotes the second parameter stored in the parameter storage unit, and S denotes the unit size $$Ai=Ai+S \qquad (2)$$

where Ai denotes i-th address, and S denotes the unit size $$Ai=Ai+OSV \qquad (3)$$

where Ai denotes i-th address, and OSV denotes the first parameter stored in the parameter storage unit,
wherein in the control processor, the beginning address of N number of rectangular regions included within two-dimensional data, in the external memory storing a plurality of pieces of two-dimensional data arranged in S-sized units in two-dimensions, is set into the address storage unit as the N number of addresses Ai(i=1 through N), and
the difference in addresses between the S-sized unit data at the beginning and end in the same row of the two-dimensional data, the size in the row direction of the rectangular region, and the number of rows of the rectangular region are set into the first parameter OSV, the second parameter W, and the third parameter L, respectively.

2. The memory controller according to claim 1:
wherein the parameter storage unit is further capable of setting a fourth parameter T;
wherein the first process is a process that executes the fourth process along with a second process after repeatedly executing a third process along with the second process M1 times according to the formula (4);
wherein the second process is a process that repeats a fifth process T times;
wherein the fifth process is a process that during the transfer of data from the external memory to the buffers in the N number of processor elements, reads out a T times portion of data in S-sized units from "N/T" number of addresses among the N number of addresses stored in the address storage unit and also "N/T" number of addresses that change each time, and stores that data in each of the buffers in the corresponding T number of processor units, so that one address corresponds to T number of adjacent processor elements;
wherein the fifth process is also a process that during transfer of data from the buffers in the N number of processor elements to the external memory, along with reading out the data stored in the buffers of each of the processor elements, writes the data read out from the buffers in the T number of processor elements within the applicable group, among each group including T number of adjacent processor elements, into one address corresponding to the group, among the "N/T" number of addresses among the N number of addresses stored in the address storage unit and also among the "N/T" number of addresses that change each time, so that one address corresponds to T number of adjacent processor elements; and
wherein the third process is a process that increases each address Ai stored in the address storage unit according to the formula (5);

$$M1=[W/(T\times S)]-1 \qquad (4)$$

where W denotes the second parameter stored in the parameter storage unit, S denotes the unit size, and T denotes the fourth parameter stored in the parameter storage unit $$Ai=Ai+S\times T \qquad (5)$$

where Ai denotes i-th address, S denotes the unit size, and T denotes the fourth parameter stored in the parameter storage unit.

3. The memory controller according to claim 1 or claim 2, wherein the data transfer unit sends an interrupt whenever all the buffers in the N number of processor elements become full during transfer of data from the external memory to the buffers in the N number of processor elements; and sends an interrupt whenever all the buffers in N number of processor elements become empty during transfer of data from the buffers in the N number of processor elements to the external memory.

4. An SIMD (Single instruction Multiple Data) processor comprising:
a control processor;
N (N is an integer of 2 or more) number of processor elements controlled by the control processor; and
a memory controller,
wherein each processor element has a capacity in S-sized units, and a buffer to temporarily store data being transferred between an external memory and the applicable processor elements;
wherein the memory controller includes:
an address storage unit capable of setting N number of addresses Ai (i=1 through N) in the external memory by way of the control processor;
a parameter storage unit capable of setting a first parameter OSV, a second parameter W, and a third parameter L by way of the control processor; and
a data transfer unit to transfer data between the external memory and the buffers for the N number of processor elements according to instructions of the data transfer from the control processor; and
wherein the data transfer unit, during data transfer, repeatedly executes a first process a certain number of times matching the third parameter L stored in the parameter storage unit;
wherein the first process is a process that executes a fourth process along with a second process after repeatedly executing the third process along with a second process M times as shown in the formula (6);
wherein the second process is a process that during the transfer of data from the external memory to the buffers in N number of processor elements, reads out data in S unit size portions from each address stored in the address storage unit, and stores that data in the buffer of the corresponding processor element, so that one address corresponds to one processor element;
wherein the second process is also a process that during transfer of data from buffers in N number of processor elements to the external memory, reads out data stored in the buffers of each of the processor elements, and writes that data into the corresponding address among N number of addresses stored in the address storage unit, so that one address corresponds to one processor element;

wherein the third process is a process that increases each address Ai stored in the address storage unit according to the formula (7);

wherein the fourth process is a process that increases each address Ai stored in the address storage unit according to the formula (8);

$$M=W/S-1 \quad (6)$$

where W denotes the second parameter ored in the parameter storage unit, and S denotes the unit size $$Ai=Ai+S \quad (7)$$

where Ai denotes i-th address, and S denotes the unit size $$Ai=Ai+OSV \quad (8)$$

where Ai denotes i-th address, and OSV denotes the first parameter stored in the parameter storage unit; and wherein the control processor:

sends a write command to each of the processor elements whenever all the buffers in the N processor elements become full during transfer of data from the external memory to the buffers in N number of processor elements;

sends a read command to each of the processor elements whenever all the buffers in the N number of processor elements become empty during transfer of data by a DMA controller from the buffers in the N number of processor elements to the external memory;

sets the beginning address of N number of rectangular regions included within two-dimensional data, in the external memory storing a plurality of pieces of two-dimensional data arranged in S-sized units in two-dimensions, into the address storage unit as the N number of addresses Ai(i=1 through N); and sets the difference in addresses between the S-sized unit data at the beginning and end in the same row of the two-dimensional data, the size in the row direction of the rectangular region, and the number of rows of the rectangular region into the first parameter OSV, the second parameter W, and the third parameter L, respectively.

5. The SIMD processor according to claim 4,
wherein the control processor:
sets the maximum value among the row direction sizes as the second parameter W when the N number of rectangular regions include different row direction sizes, and sets the maximum value for the number of rows as the parameter L when the N number of rectangular regions include different numbers of rows.

6. The SIMD processor according to claim 4 or claim 5,
wherein the two-dimensional data is image data, and
wherein the S-sized unit data is data for a single pixel.

7. The SIMD processor according to one or any one of claim 4 through claim 5,
wherein the parameter storage unit is further capable of setting a fourth parameter T by way of the control processor;
wherein the control processor sets the divisor of N into the parameter storage unit as the fourth parameter T;
wherein the data transfer unit in the memory controller:
executes the fourth process along with a second process after repeatedly executing a third process along with the second process M1 times as shown in the formula (9) as the first process; and
executes the second process as a process that repeats a fifth process T times;

wherein the fifth process is a process that during the transfer of data from the external memory to the buffers in the N number of processor elements, respectively reads out a T times portion of data in S-sized units from "N/T" number of addresses among the N number of addresses stored in the address storage unit, and also from "N/T" number of addresses that change each time, and stores that data in each of the buffers in the corresponding T number of processor elements, so that one address corresponds to T number of adjacent processor elements;

wherein the fifth process is also a process that during transfer of data from the buffers in the N number of processor to the external memory, along with reading out data stored in the buffers of each of the processor elements so that one address corresponds to T number of adjacent processor elements, writes the data read out from the buffers in the T number of processor elements within the applicable group, among each group including T number of adjacent processor elements, into one address corresponding to the group among the "N/T" number of addresses among the N number of addresses stored in the address storage unit and also among the "N/T" number of address that change each time;

wherein the third process is a process that increases each address Ai stored in the address storage unit according to the formula (10);

$$M1=[W/(T\times S)]-1 \quad (9)$$

where W denotes the second parameter stored in the parameter storage unit, S denotes the unit size, and T denotes the fourth parameter stored in the parameter storage unit;

$$Ai=Ai+S\times T \quad (10)$$

where Ai denotes i-th address, S denotes the unit size, and T denotes the fourth parameter stored in the parameter storage unit;

wherein the control processor sends a data exchange instruction to N number of processor elements, before sending the applicable data transfer instruction during the transfer data from the buffers in the N number of processor elements to the external memory, and after the DMA controller has completed the transfer of the applicable data according to the data transfer instruction during transfer of data from the external memory to the buffers in the N number of processor elements, and wherein the N number of processor elements exchange data in the local memories among the mutual adjacent processor elements according to the data exchange instructions.

8. The SIMD processor according to one or any one of claim 4 through claim 5,
wherein the DMA controller:
sends an interrupt when all the buffers in the N number of processor elements become full during transfer of data from the external memory to the buffers of N number of processor elements; and
sends an interrupt when all the buffers in N number of processor elements become empty during transfer of data from the buffers in the N number of processor elements to the external memory, and
wherein the control processor sends a read command or a write command to the N number of processor elements according to the interrupt.

* * * * *